US012775264B2

(12) United States Patent
Greer

(10) Patent No.: US 12,775,264 B2
(45) Date of Patent: Oct. 27, 2026

(54) SYSTEMS AND METHODS FOR FABRICATING DOUBLE-CONTOURED SHIMS

(71) Applicant: The Boeing Company, Arlington, VA (US)

(72) Inventor: Christopher A. Greer, Greenwood, SC (US)

(73) Assignee: The Boeing Company, Arlington, VA (US)

( * ) Notice: Subject to any disclaimer, the term of this patent is extended or adjusted under 35 U.S.C. 154(b) by 738 days.

(21) Appl. No.: 18/318,812

(22) Filed: May 17, 2023

(65) Prior Publication Data

US 2024/0385588 A1 Nov. 21, 2024

(51) Int. Cl.
*G05B 19/4097* (2006.01)

(52) U.S. Cl.
CPC .................... *G05B 19/4097* (2013.01); *G05B 2219/35134* (2013.01)

(58) Field of Classification Search
CPC .................. G05B 19/4097; G05B 2219/35134
See application file for complete search history.

(56) References Cited

U.S. PATENT DOCUMENTS

| | | | |
|---|---|---|---|
| 6,618,505 B2 | 9/2003 | Cork et al. | |
| 7,756,321 B2 | 7/2010 | Marsh et al. | |
| 8,756,792 B2 | 6/2014 | Boyl-Davis et al. | |
| 8,813,382 B1 * | 8/2014 | Buttrick | G01B 7/287 33/563 |
| 9,599,983 B2 | 3/2017 | Valenzuela et al. | |
| 9,990,446 B2 | 6/2018 | Lagally et al. | |
| 10,139,808 B2 | 11/2018 | Engelbart et al. | |
| 10,450,053 B2 | 10/2019 | Doyle et al. | |
| 10,891,278 B2 | 1/2021 | Page et al. | |
| 2005/0120648 A1 * | 6/2005 | Gorman | E06B 1/6069 52/204.5 |
| 2012/0316666 A1 * | 12/2012 | Boyl-Davis | G05B 19/40931 700/98 |
| 2017/0132355 A1 * | 5/2017 | Vasquez | B64C 1/26 |
| 2017/0138385 A1 * | 5/2017 | Clark | G06F 30/23 |
| 2017/0327201 A1 | 11/2017 | Doyle et al. | |
| 2021/0406412 A1 * | 12/2021 | Cramer | G06F 30/20 |
| 2022/0026895 A1 | 1/2022 | Leitch et al. | |
| 2022/0095704 A1 * | 3/2022 | Salemeh | B33Y 10/00 |

* cited by examiner

*Primary Examiner* — Gary Collins
(74) *Attorney, Agent, or Firm* — Walters & Wasylyna LLC

(57) ABSTRACT

A system for fabricating a double-contoured shim includes a model generator and a manufacturing system. The model generator generates a shim model to fill a gap between a first mating-surface and a second mating-surface. The model generator generates a virtual plane that divides the shim model into a first shim model and a second shim model. A first shim is fabricated based on the first shim model. The first shim includes a first contoured shim-surface that is complementary to a first mating-surface area of the first mating-surface and a first planar shim-surface that is opposite the first contoured shim-surface. A second shim is fabricated based on the second shim model. The second shim includes a second contoured shim-surface that is complementary to a second mating-surface area of the second mating-surface and a second planar shim-surface that is opposite the second contoured shim-surface.

20 Claims, 16 Drawing Sheets

SYSTEMS AND METHODS FOR FABRICATING DOUBLE-CONTOURED SHIMS

FIELD

The present disclosure relates generally to predictive shimming and assembly manufacturing and, more particularly, to systems and methods for predictive shimming, fabricating double-contoured shims, and assembly manufacturing that uses the double-contoured shims to fill gaps in joints between part surfaces.

BACKGROUND

During the assembly of parts, it may be necessary to affix the parts to one another such that any gap between two parts is occupied by a filler material, commonly referred to as a "shim." Gaps are typically formed by misalignment of parts during assembly or by variation in manufacture of the parts being assembled. A shim is designed to approximately fill the gap between the mating surfaces of the parts. Shims are used throughout the aerospace industry to compensate for part variation due to the complex aerodynamic shapes of various assembled parts. For example, when a gap exceeds a specified tolerance, a shim can be inserted into the gap in order to assure a within-tolerance fit between the parts.

Manual shimming requires the parts to be installed and measured, shims to be fabricated and installed, and gaps to be checked. Measuring gaps is a time-consuming process and fabricating the shims after part installation requires additional production flow. In recent years, a process called predictive shimming has been developed to reduce the manufacturing time and cost associated with shimming activities. Predictive shimming typically involves measuring surfaces of the parts prior to assembly, performing a virtual assembly of the parts, estimating the resulting gap between the parts, and then fabricating a shim prior to assembly.

However, in conventional shimming techniques, the measured or estimated deviations between mating surfaces of the parts are summed and pushed to one side for fabrication of the shim. As such, a fabricated shim only addresses surface contour of one of the mating surfaces and surface contour of the opposing mating surface is considered addressed after applying clamp-up forces and final connection of the assembled parts. Accordingly, those skilled in the art continue with research and development efforts in the field of predictive shimming and assembly manufacturing.

SUMMARY

Disclosed are examples of a system for fabricating a double-contoured shim, a method for fabricating a double-contoured shim, a double-contoured shim, a method for shimming, a computer program product, a data processing system, and a computer-readable storage media. The following is a non-exhaustive list of examples, which may or may not be claimed, of the subject matter according to the present disclosure.

In an example, the disclosed system includes a computer and a manufacturing system. The computer generates a shim model to fill a gap between a first mating-surface of a first component and a second mating-surface of a second component. The computer generates a virtual plane that divides the shim model into a first shim model and a second shim model. The manufacturing system fabricates a first shim that is based on the first shim model and that includes a first contoured shim-surface that is complementary to a first mating-surface area of the first mating-surface and a first planar shim-surface that is opposite the first contoured shim-surface. The manufacturing system fabricates a second shim that is based on the second shim model and that includes a second contoured shim-surface that is complementary to a second mating-surface area of the second mating-surface and a second planar shim-surface that is opposite the second contoured shim-surface.

In an example, the method for fabricating includes steps of: (1) generating a shim model to fill a gap between a first mating-surface of a first component and a second mating-surface of a second component; (2) generating a virtual plane that divides the shim model into a first shim model and a second shim model; (3) fabricating a first shim, based on the first shim model, that includes a first contoured shim-surface that is complementary to a first mating-surface area of the first mating-surface and a first planar shim-surface that is opposite the first contoured shim-surface; and (4) fabricating a second shim, based on the second shim model, that includes a second contoured shim-surface that is complementary to a second mating-surface area of the second mating-surface and a second planar shim-surface that is opposite the second contoured shim-surface.

In an example, the disclosed double-contoured shim includes a first shim and a second shim. The first shim includes a first contoured shim-surface and a first planar shim-surface that is opposite the first contoured shim-surface. The second shim includes a second contoured shim-surface and a second planar shim-surface that is opposite the second contoured shim-surface. The first shim and the second shim are coupled together along the first planar shim-surface and the second planar shim-surface.

In one or more examples, the method for shimming includes steps of: (1) manufacturing a double-contoured shim; (2) installing the double-contoured shim in a gap between a first mating-surface of a first component and a second mating-surface of a second component; and (3) assembling the first component, the second component, and the double-contoured shim to form a finally assembled structure.

In an example, the disclosed computer program product includes instructions that, when executed by a computer, causes the computer to carry out one or more steps of: (1) generating a shim model to fill a space between a first mating-surface of a first component and a second mating-surface of a second component; (2) generating a virtual plane that divides the space into a first portion and a second portion; (3) generating a first shim model that substantially fills the first portion of the space; and (4) generating a second shim model that substantially fills the second portion of the space.

In an example, the disclosed data processing system includes a processor and memory storing program code that, when executed by the processor, causes the processor to perform one or more steps of: (1) generating a shim model to fill a space between a first mating-surface of a first component and a second mating-surface of a second component; (2) generating a virtual plane that divides the space into a first portion and a second portion; (3) generating a first shim model that substantially fills the first portion of the space; and (4) generating a second shim model that substantially fills the second portion of the space.

In an example, the computer-readable storage media includes instructions that, when executed by a computer, causes the computer to carry out one or more steps of: (1) generating a shim model to fill a space between a first mating-surface of a first component and a second mating-surface of a second component; (2) generating a virtual plane that divides the space into a first portion and a second portion; (3) generating a first shim model that substantially fills the first portion of the space; and (4) generating a second shim model that substantially fills the second portion of the space.

Other examples of the system, the method, and the double-contoured shim disclosed herein will become apparent from the following detailed description, the accompanying drawings, and the appended claims.

DETAILED DESCRIPTION

Referring generally to FIGS. 1-15, by way of examples, the present disclosure is directed to a system 100 and a method 1000 for using predictive shimming techniques to design and fabricate a double-contoured shim 200. As will be described herein in more detail, the double-contoured shim 200 has surface contour on both sides or on opposed part-mating surfaces. Generally, in accordance with one or more examples, the system 100 and the method 1000 use measurement data acquired from mating surfaces of two components to virtually align the two components and determine a geometry of the double-contoured shim 200 needed to fill a gap between the mating surfaces of the assembled components. The system 100 and the method 1000 use data processing techniques that enable design and fabrication of the double-contoured shim 200 prior to assembly of the two components. By fabricating the double-contoured shim 200 prior to assembly, the system 100 and the method 1000 reduce production flow and cost. The double-contoured shim 200 is designed to substantially fill the gap between the mating surfaces of assembled parts. The double-contoured shim 200 substantially fills the gap by being fabricated with a surface contour on both sides, which address surface contour and/or surface variations of the mating surfaces of both of the components.

Figure 1:
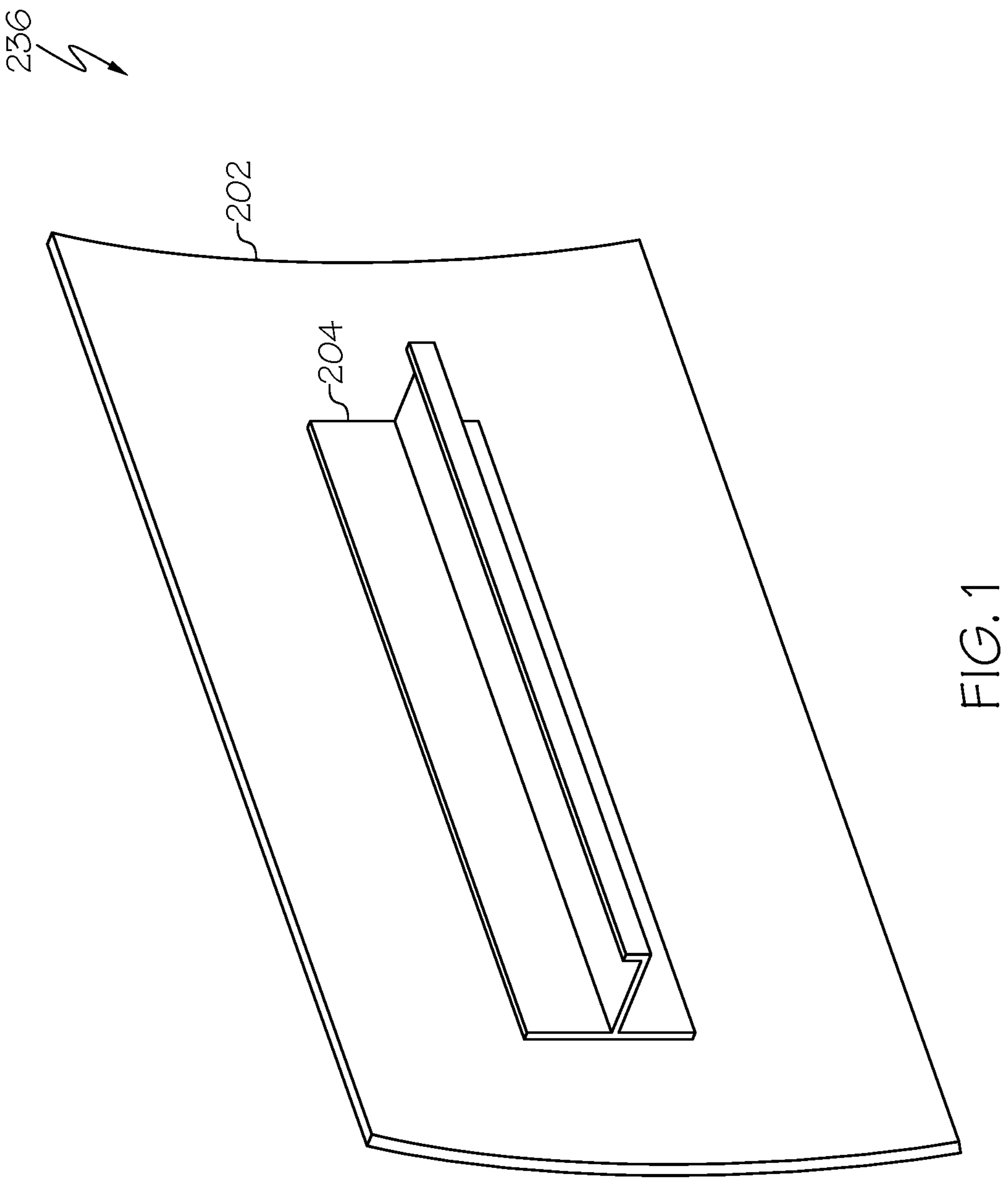
FIG. 1 is a schematic illustration of a portion of a structure in an assembled condition that includes a first component coupled to second component.

Referring now to FIG. 1, which schematically illustrates an example of a portion of a structure 236 in an assembled condition. The structure 236 includes a first component 202 and a second component 204, which are attached, coupled, or otherwise joined together. In the illustrated example, the first component 202 is a panel, such as a skin panel of a fuselage section an aircraft, and the second component 204 is a stiffener, such as a longeron or a stringer.

Figure 2:
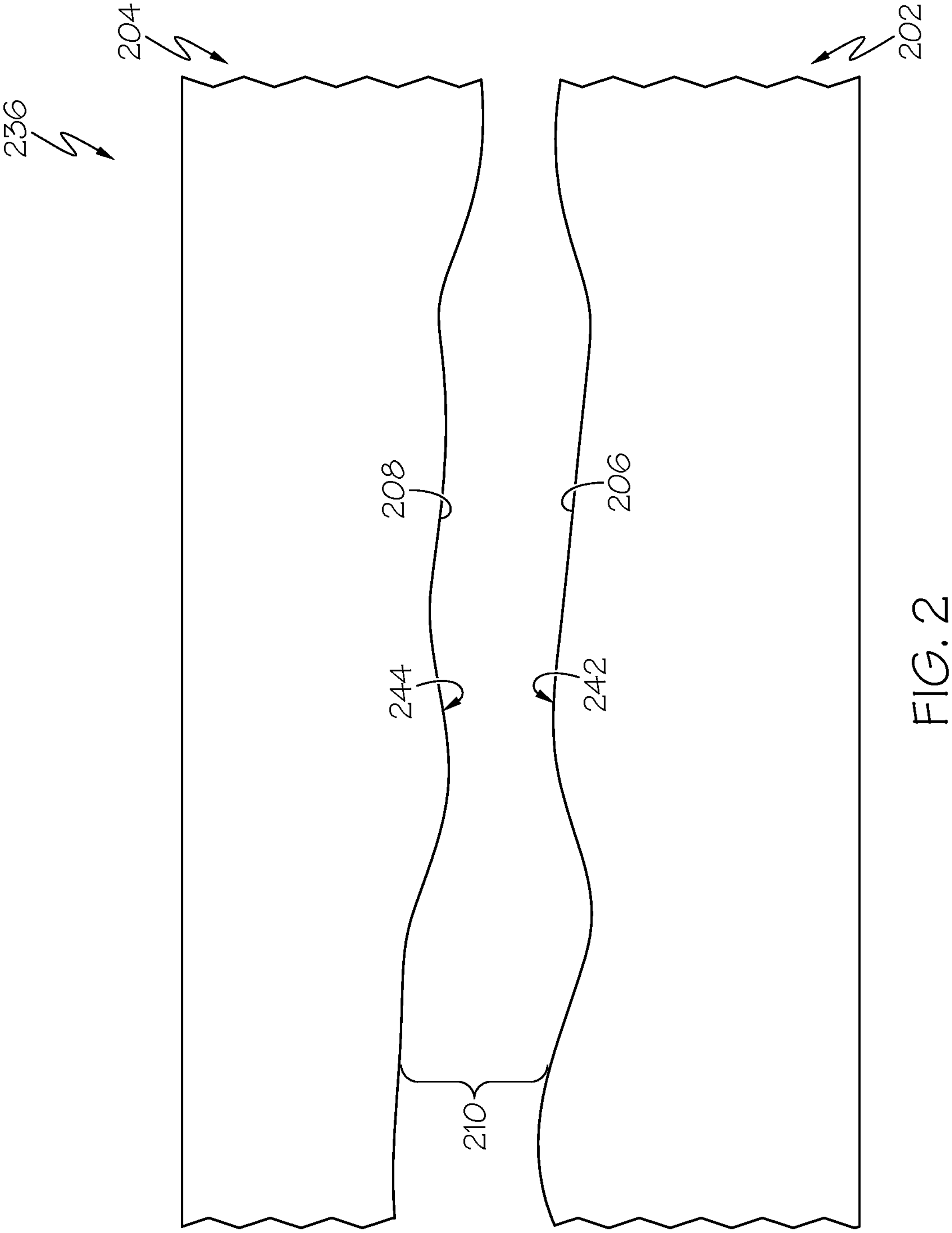
FIG. 2 is a schematic, section view, of an example of a portion of the structure in the assembled condition and depicting a gap between the first component and the second component.

Referring now to FIG. 2, which schematically illustrates an example of a portion of the structure 236 in the assembled condition. As illustrated, in some circumstances, the structure 236 includes a gap 210 formed between a first portion of a first mating-surface 206 of the first component 202 and a second portion of a second mating-surface 208 of the second component 204. The gap 210 may be the result of manufacturing variations in the first component 202 and the second component 204. As an example, at least a portion of the first mating-surface 206 of the first component 202 includes a first mating-surface contour 242 and at least a portion of the second mating-surface 208 includes a second mating-surface contour 244. The variations or deviations in the surface contours of the first mating-surface 206 and the second mating-surface 208 form the gap 210.

When the gap 210 is larger than an acceptable manufacturing tolerance, the gap 210 needs to be filled. As such, a shim can be fabricated and installed into the gap 210. The present disclosure recognizes that shims fabricated using conventional shimming techniques, including manual shimming and predictive shimming, include one side that is flat and one side that has contour. As such, all of the surface-to-surface gap deviations are applied with respect to one side of the shim. It is assumed that the flat side of the shim will conform to an actual part surface that it interfaces with after final assembly. This technique simplifies the machining of shims. While this shimming technique may be adequate for surfaces that are generally flat or that include a relatively low degree of surface contour, it is inadequate for a relatively high degree of surface contour on one or both of the mating part surfaces. As such, the double-contoured shim 200 (FIG. 4) disclosed herein provides a solution to this problem. The double-contoured shim 200 is fabricated with contour on both sides and is installed into the gap 210 in order to assure a within-tolerance fit between the first component 202 and the second component 204.

Figure 12A:
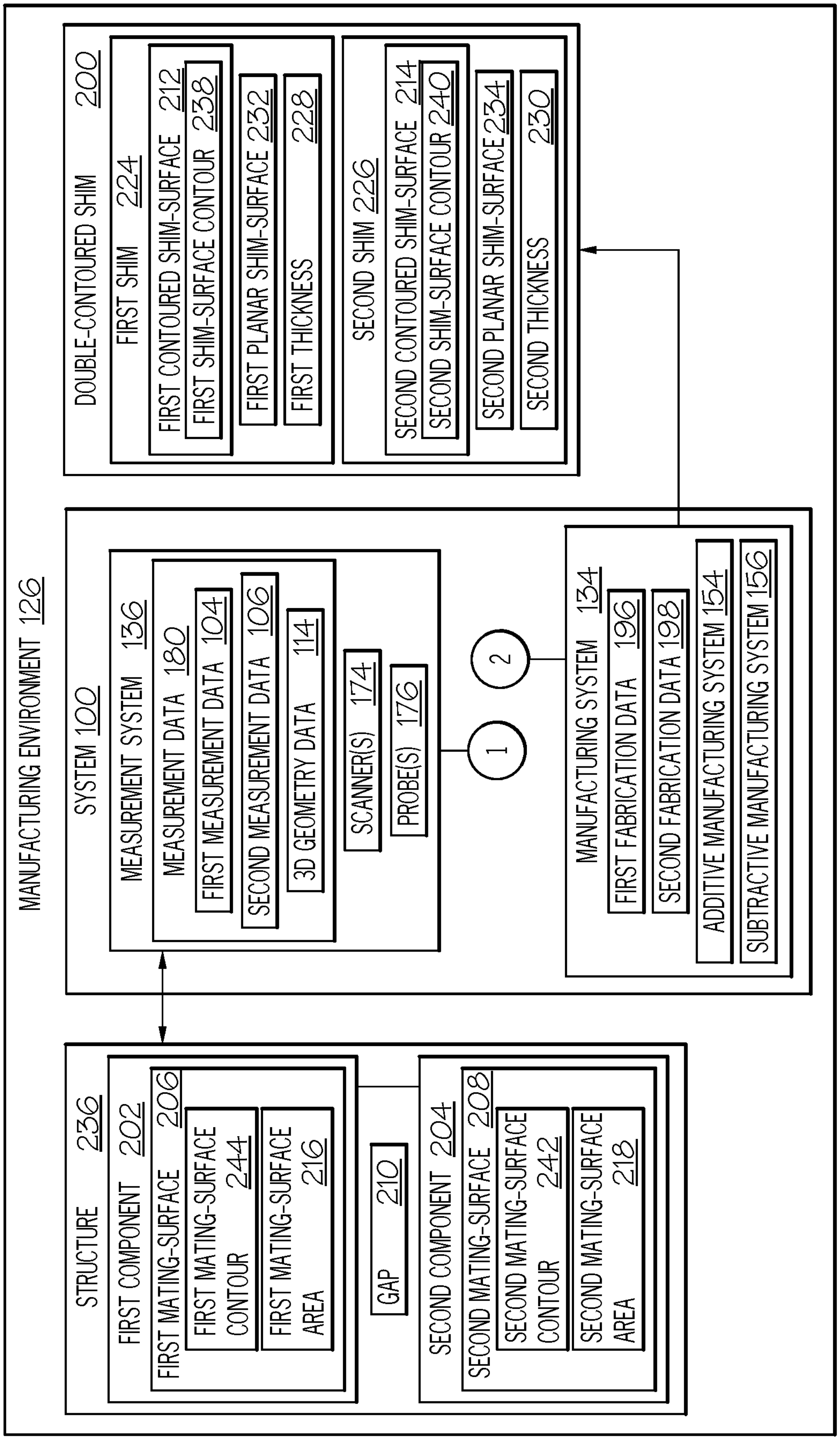
FIGS. 12A and 12B, in combination, is a schematic block diagram of an example of a manufacturing environment.
Figure 12B:
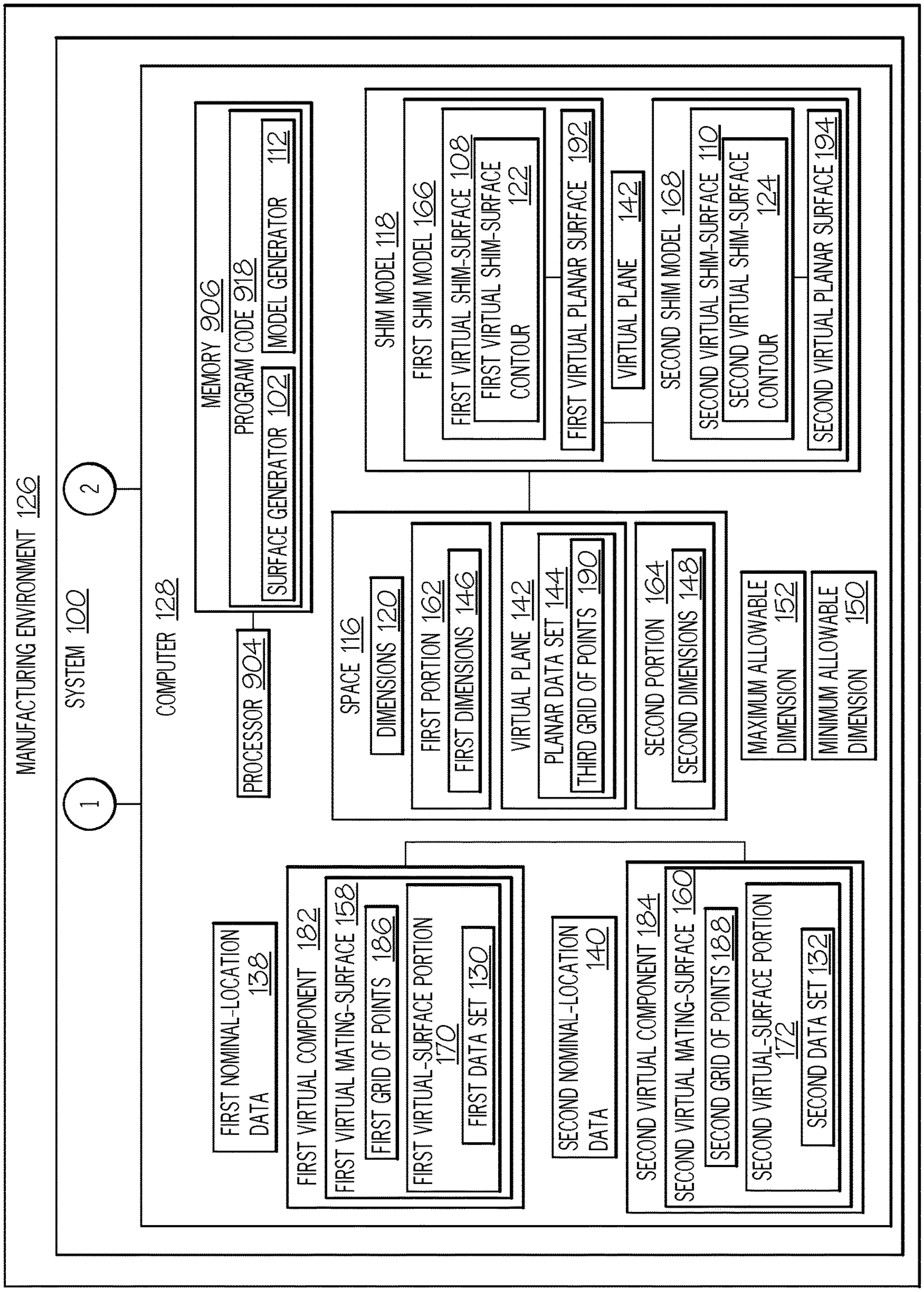
Figure 13:
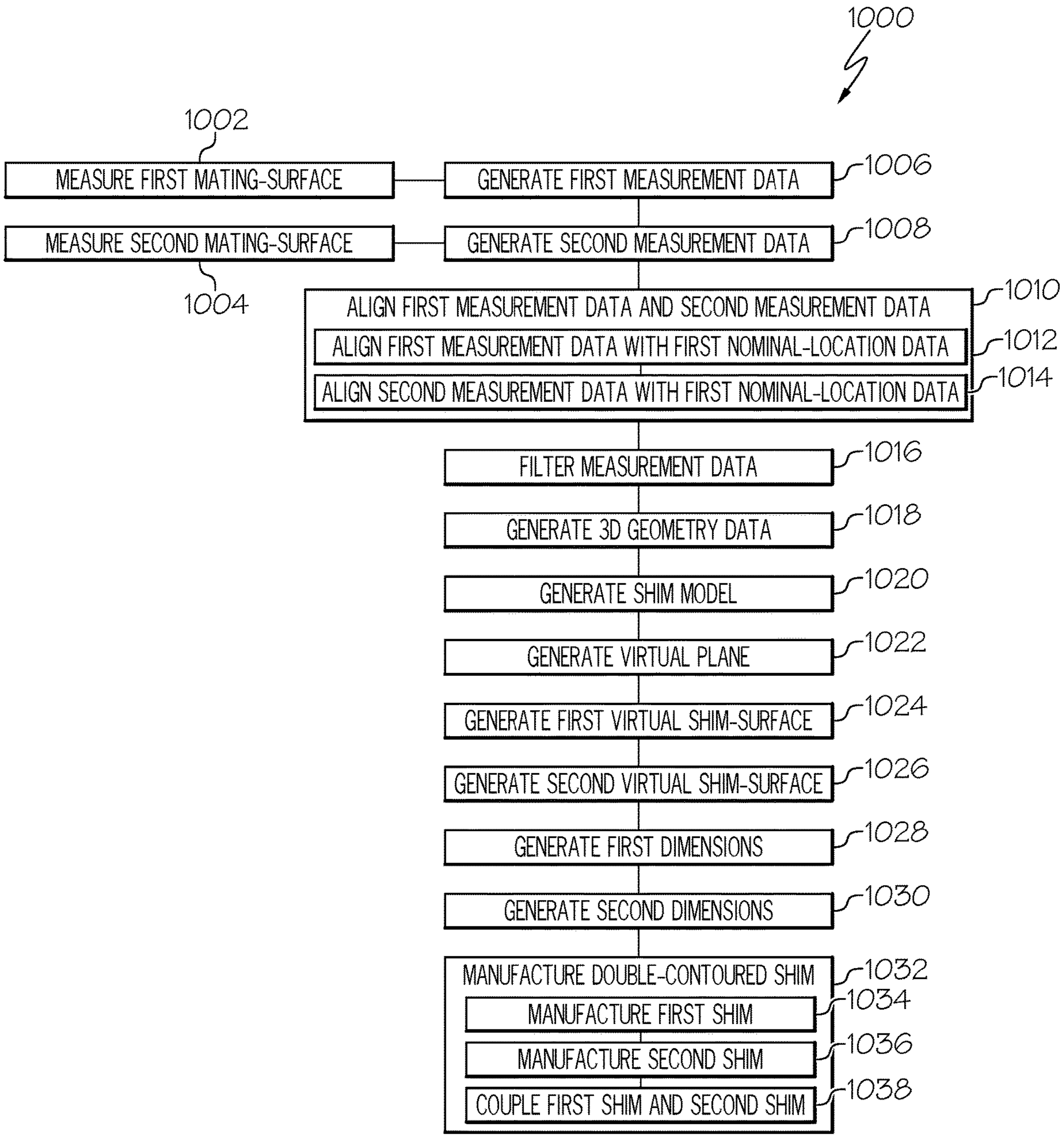
FIG. 13 is a flow diagram of an example of a method for fabricating a double-contoured shim.

Referring now to FIGS. 12A, 12B and 13. FIGS. 12A and 12B, in combination, schematically illustrate an example of a manufacturing environment 126 in which the system 100 is utilized to design and manufacture the double-contoured shim 200. FIGS. 12A and 12B, in combination, may also be referred to herein as FIG. 12. FIG. 13 is a flow diagram of an example of the method 1000.

In one or more examples, the system 100 and the method 1000 utilize three-dimensional (3D) measurement data acquired from both the first component 202 and the second component 204. Utilizing both data sets, a three-dimensional geometry for the double-contoured shim 200 is created using a predictive shimming process. Generally, this predictive shimming process includes measuring surfaces of the first component 202 and the second component 204. More specifically, the first mating-surface 206 of the first component 202 that will mate with second component 204 and the second mating-surface 208 of the second component 204 that will mate with the first component 202 are measured. The surface measurement data sets are used in a virtual assembly process. During virtual assembly, the first component 202 and the second component 204 are virtually oriented and aligned relative to an aircraft coordinate system to estimate the varying thickness of the gap 210 between the first mating-surface 206 and the second mating-surface 208.

As described above, in one or more examples, the system 100 and the method 1000 utilize a predictive shimming process. Such predictive shimming processes are well-known and use commercially available 3D metrology equipment to measure the surfaces and/or features of the parts (e.g., the first component 202 and the second component 204). In one or more examples, the surface measurements are taken using at least one scanner 174 (e.g., a laser scanner, a structured light scanner, a point-based scanner, and other systems capable of creating or generating a point cloud) and measurement data 180 is stored as high-density point clouds. In one or more examples, the surface measurements are taken using at least one probe 176 and the measurement data 180 is stored as discrete points.

After the measurement data 180 has been acquired, the measurement data 180 is used to virtually align the first component 202 and the second component 204 in an assembled condition. In one or more examples, the measurement data 180 is aligned with an engineering model that specifies the locations of all parts in the final assembly. In one or more examples, the measurement data 180 for the first component 202 and the second component 204 is loaded into a computer program or application used to align measurement data sets to engineering models. The computer program or application (e.g., an alignment module or alignment application) is configured to align a first measurement data set (e.g., first measurement data 104) representing the first component 202 and a second measurement data set (e.g., second measurement data 106) representing the second component 204 to an engineering model of the assembled structure 236. In one or more examples, this alignment process uses a weighted fit or best fit algorithm to align the measured components to their engineering locations. In one or more examples, the alignment process aligns both sets of measurements to engineering locations to optimize the final part alignment rather than simply minimizing gaps between the two parts.

Figure 3:
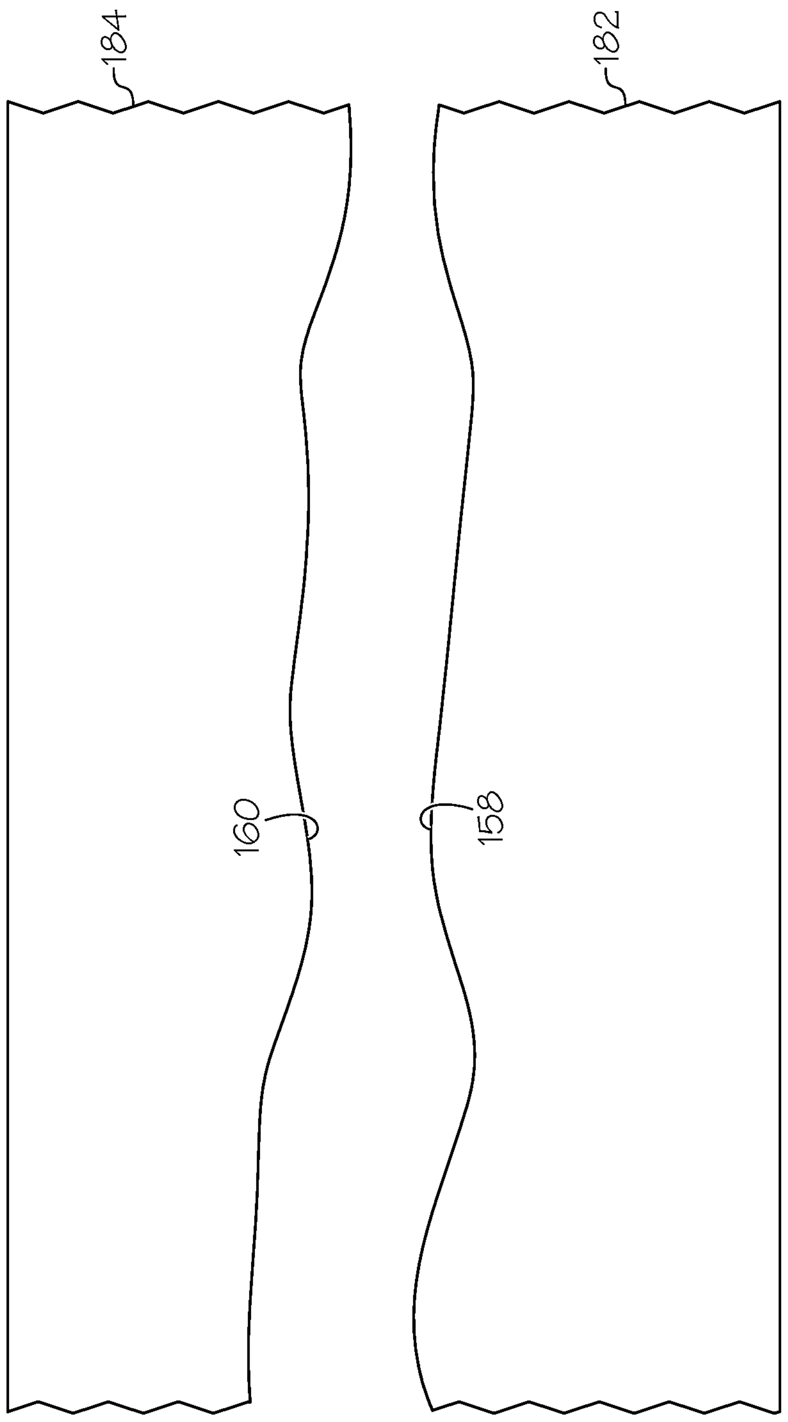
FIG. 3 is a schematic illustration of an example of a portion of a first virtual component and a second virtual component aligned in the assembled condition.

Referring now to FIG. 3, which schematically illustrates an example of a portion of a first virtual component 182 and a second virtual component 184 as aligned with an engineering model. The first virtual component 182 is a virtual representation of the first component 202 as represented by the first measurement data 104. The second virtual component 184 is a virtual representation of the second component 204 as represented by the second measurement data 106.

Referring again to FIGS. 12 and 13, in one or more examples, the aligned measurement data 180 for the first component 202 is exported from the alignment application and is imported into a computer program or application (e.g., surface generator module or surface generator application) that is configured to fit a first virtual mating-surface 158 to the first mating-surface 206 of the first component 202 as represented by the first measurement data 104. Similarly, the aligned measurement data 180 for the second component 204 is exported from the alignment application and is imported into a computer program or application (e.g., surface generator module or surface generator application) that is configured to fit a second virtual mating-surface 160 to the second mating-surface 208 of the second component 204 as represented by the second measurement data 106.

In one or more examples, the first virtual mating-surface 158 and the second virtual mating-surface 160 that were fitted to the aligned measurement data 180 are imported into a computer program or application (e.g., model generator module or model generator application) that is configured to estimate the geometry, size, shape, etc. of a space 116 (FIG. 4) between the first virtual mating-surface 158 and the second virtual mating-surface 160. In these examples, the space 116 is representative of the gap 210 (FIG. 2) between the first mating-surface 206 and the second mating-surface 208.

In one or more examples, the computer program or application (e.g., model generator module or model generator application) generates a first grid of points 186 on the fitted first virtual shim-surface 108 and a second grid of points 188 on the fitted second virtual shim-surface 110. In one or more examples, the computer program or application (e.g., model generator module or model generator application) estimates the dimensions between the first grid of points 186 and the second grid of points 188, when the first component 202 and the second component 204 are assembled, to estimate the geometry the space 116.

Figure 4:
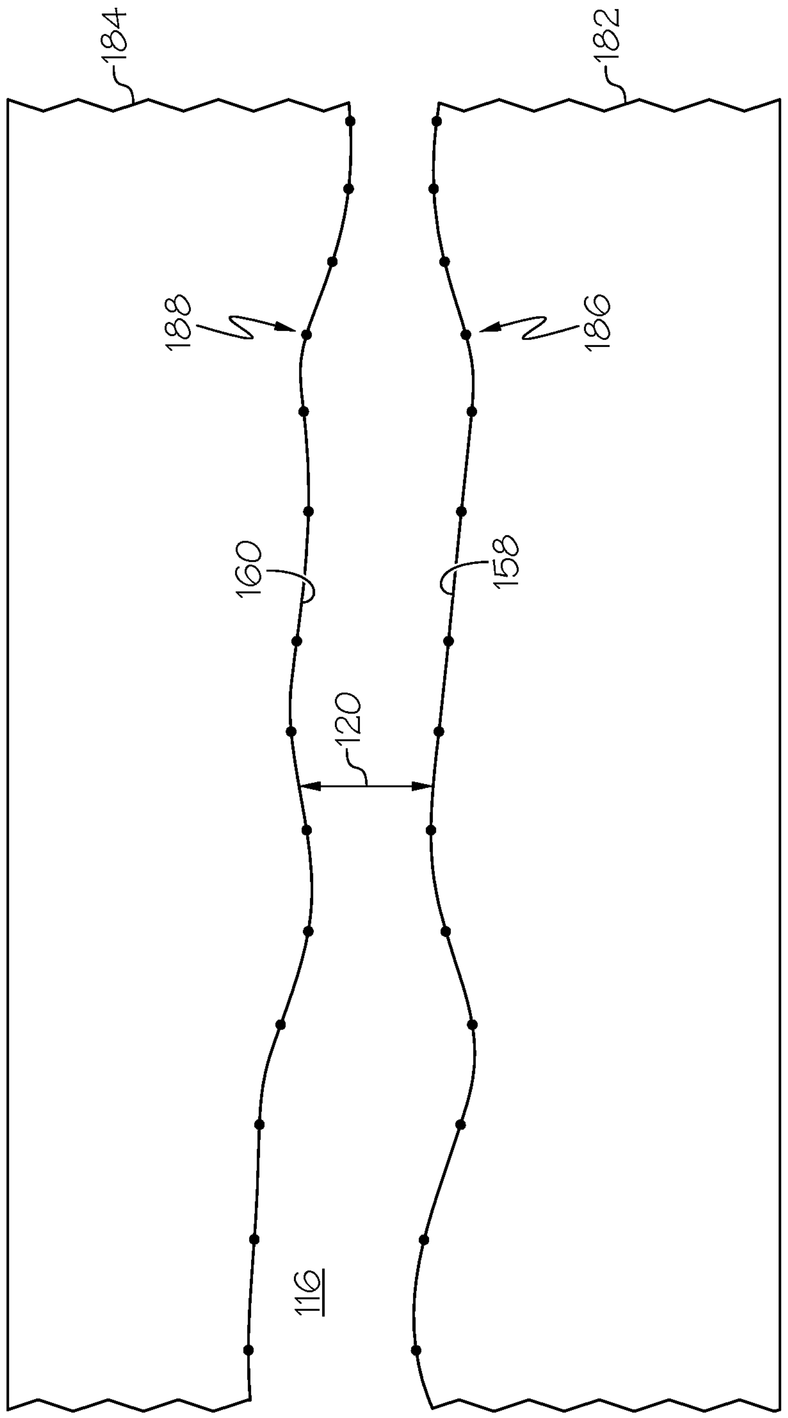
FIG. 4 is a schematic illustration of an example of a portion of a first virtual mating-surface fitted to the first virtual component and a second virtual mating-surface fitted to the second virtual component.

Referring now to FIG. 4, which schematically illustrates an example of a portion of the first virtual component 182 and the second virtual component 184 as aligned with an engineering model. The first virtual mating-surface 158 is fitted to the first mating-surface 206 as represented by the first virtual component 182. The second virtual mating-surface 160 is fitted to the second mating-surface 208 as represented by the second virtual component 184. The space 116 is formed between the first virtual mating-surface 158 and the second virtual mating-surface 160. The first grid of points 186 is generated on the first virtual mating-surface 158. The second grid of points 188 is generated on the second virtual mating-surface 160.

In one or more examples, two groups of vectors are created during this operational step. As an example, a first group of vectors is a set of vectors from a first grid of points 186 to the second virtual mating-surface 160. A second group of vectors is a set of vectors from the second grid of points 188 to the first virtual mating-surface 158.

Referring again to FIGS. 12 and 13, in one or more examples, after dimensions 120 of the space 116 has been estimated, the estimated dimensions 120 are projected to a two-dimensional (2D) shim profile. In one or more examples, the computer program or application (e.g., model generator module or model generator application) generates a shim model 118 that substantially fills the space 116. In one or more examples, this is done by mapping the vectors to the 2D shim profile such that the first group of vectors start at a first virtual shim-surface 108 of the shim model 118 and end at a second virtual shim-surface 110 of the shim model 118 and such that the second group of vectors start at the second virtual shim-surface 110 of the shim model 118 and end at the first virtual shim-surface 108 of the shim model 118. Accordingly, the first virtual shim-surface 108 includes a first virtual shim-surface contour 122 that is complementary to or that substantially matches a contour of the first mating-surface 206 and the second virtual shim-surface 110 includes a second virtual shim-surface contour 124 that is complementary to or that substantially matches a contour of the second mating-surface 208.

For the purpose of the present disclosure, a first item, such as a first surface, a first virtual-surface, and the like, being complementary to or substantially matching a second item, such as a second surface, a second virtual-surface, and the like, refer to the first item and the second item having an at least approximately equivalent shape, contour, and/or geometry such that, when the first item and the second item are mated or are situated in intimate (e.g., surface) contact, they form a whole without significant spaces or gaps between the first and second items.

In one or more examples, the computer program or application (e.g., model generator module or model generator application) then generates a virtual plane 142 that is situated between the first virtual shim-surface 108 and the second virtual shim-surface 110. In one or more examples, the virtual plane 142 divides the shim model 118 into a first shim model 166 and a second shim model 168 (FIG. 5).

Figure 5:
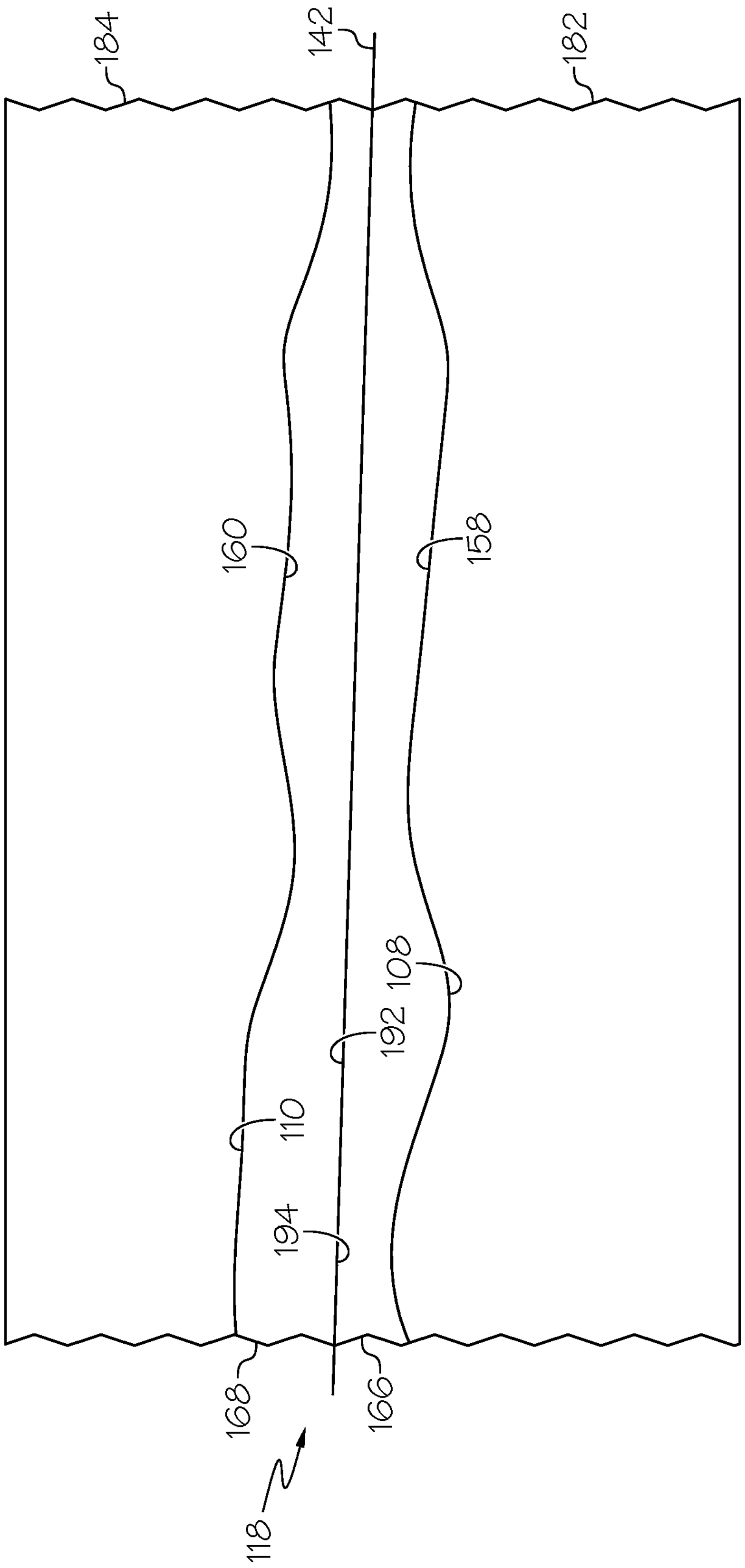
FIG. 5 is a schematic illustration of an example of a portion of a shim model that substantially fills a space between the first virtual mating-surface and the second virtual mating-surface and with the shim model divided by a virtual plane.

Referring now to FIG. 5, which schematically illustrates an example of a portion of the shim model 118 divided into the first shim model 166 and the second shim model 168 by the virtual plane 142, for example, as generated in accordance with the above example. The first shim model 166 includes the first virtual shim-surface 108 that is fitted to the first virtual mating-surface 158 and that has the first virtual shim-surface contour 122. The first shim model 166 includes a first virtual planar surface 192 that is fitted to the virtual plane 142 and that is opposite the first virtual shim-surface 108. The second shim model 168 includes the second virtual shim-surface 110 that is fitted to the second virtual mating-surface 160 and that has the second virtual shim-surface contour 124. The second shim model 168 includes a second virtual planar surface 194 that is fitted to the virtual plane 142 and that is opposite the second virtual shim-surface 110.

Figure 6:
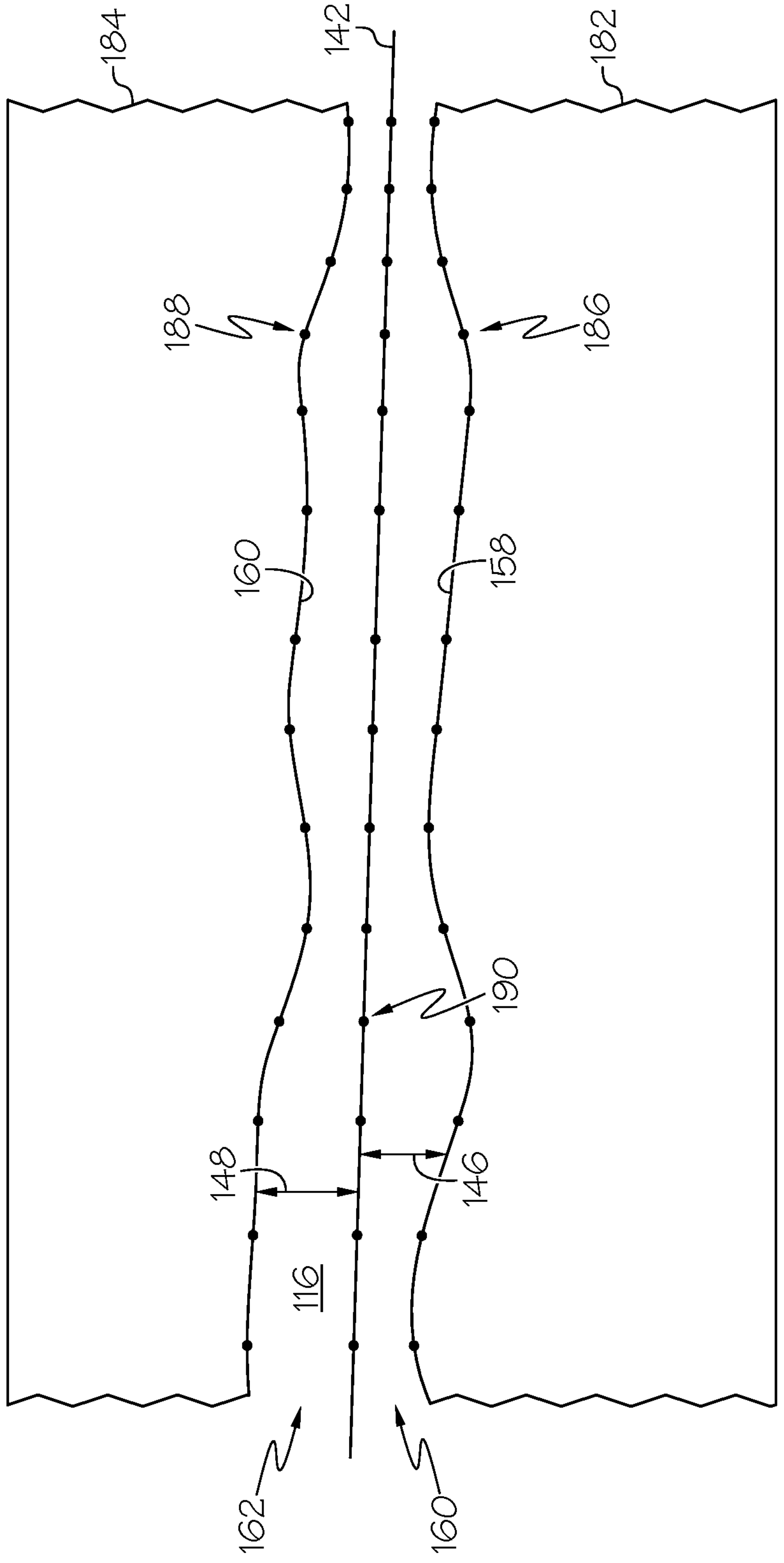
FIG. 6 is a schematic illustration of an example of a portion of the first virtual component and the second virtual component aligned in the assembled condition and with a space between the first virtual mating-surface and the second virtual mating-surface divided by a virtual plane.

Referring again to FIGS. 12 and 13, in one or more examples, the computer program or application (e.g., model generator module or model generator application) generates the virtual plane 142 that is situated between the first virtual mating-surface 158 and the second virtual mating-surface 160. In one or more examples, the virtual plane 142 divides the space 116 into a first portion 162 and a second portion 164 (FIG. 6). In one or more examples, the computer program or application (e.g., model generator module or model generator application) is configured to estimate the geometry, size, shape, etc. of the first portion 162 of the space 116 between the first virtual mating-surface 158 and the virtual plane 142 and of the second portion 164 of the space 116 between the second virtual mating-surface 160 and the virtual plane 142.

In one or more examples, the computer program or application (e.g., model generator module or model generator application) generates a third grid of points 190 (FIG. 6) on the virtual plane 142. In one or more examples, the computer program or application (e.g., model generator module or model generator application) estimates the dimensions between the first grid of points 186 and the third grid of points 190 and estimates the dimensions between the second grid of points 188 and the third grid of points 190, when the first component 202 and the second component 204 are assembled, to estimate the geometry the first portion 162 and the second portion 164 of the space 116.

Referring now to FIG. 6, which schematically illustrates an example of a portion of the first virtual component 182 and the second virtual component 184 as aligned. The space 116 between the first virtual mating-surface 158 and the second virtual mating-surface 160 is divided into the first portion 162 and the second portion 164 by the virtual plane 142. The first grid of points 186 is generated on the first virtual mating-surface 158. The second grid of points 188 is generated on the second virtual mating-surface 160. The third grid of points 190 is generated on the virtual plane 142.

In one or more examples, two groups of vectors are created during this operational step. As an example, a first group of vectors is a set of vectors from the third grid of points 190 to the first grid of points 186. The vectors of the first group are normal to the virtual plane 142. A second group of vectors is a set of vectors from the third grid of points 190 to the second grid of points 188. The vectors of the second group are normal to the virtual plane 142.

Referring again to FIGS. 12 and 13, in one or more examples, after first dimensions 146 of the first portion 162 and second dimensions 148 of the second portion 164 of the space 116 have been estimated, the estimated first dimensions 146 and second dimensions 148 are projected to a pair of 2D shim profiles. In one or more examples, the computer program or application (e.g., model generator module or model generator application) generates the first shim model 166 that substantially fills the first portion 162 of the space 116. The computer program or application (e.g., model generator module or model generator application) generates the second shim model 168 that substantially fills the second portion 164 of the space 116. In one or more examples, this is done by mapping the vectors to the 2D shim profiles such that the first group of vectors start at the virtual plane 142 and end at the first virtual shim-surface 108 of the first shim model 166 and such that the second group of vectors start at the virtual plane 142 and end at the second virtual shim-surface 110 of the second shim model 168. Accordingly, the first virtual shim-surface 108 includes the first virtual shim-surface contour 122 that is complementary to or that substantially matches a contour of the first mating-surface 206 and the second virtual shim-surface 110 includes the second virtual shim-surface contour 124 that is complementary to or that substantially matches a contour of the second mating-surface 208.

Since both sides of the double-contoured shim 200 will have surface contour after fabrication, the two vector groups are not merged together and the variations are not pushed to one side of the shim as in conventional shimming techniques. Rather, the two vector groups originate from the virtual plane 142, thereby enabling the first virtual shim-surface 108 to be designed and fabricated to have the first virtual shim-surface contour 122 and the second virtual shim-surface 110 to be designed and fabricates to have the second virtual shim-surface contour 124.

Generally, the first dimensions 146 of the first portion 162 of the space 116 will vary and are measured in a direction normal to the virtual plane 142 at a plurality of points across the virtual plane 142. More specifically, a distance between the virtual plane 142 and the first virtual shim-surface 108 of the first shim model 166 along a line normal to any point on the virtual plane 142 will be the thickness of a first shim 224, fabricated using the first shim model 166, at that point. Similarly, the second dimensions 148 of the second portion 164 of the space 116 will vary and are measured in a direction normal to the virtual plane 142 at a plurality of points across the virtual plane 142. More specifically, a distance between the virtual plane 142 and the second virtual shim-surface 110 of the second shim model 168 along a line normal to any point on the virtual plane 142 will be the thickness of a second shim 226, fabricated using the second shim model 166, at that point.

In one or more examples, the virtual plane 142 is situated at an approximately central location between the first virtual mating-surface 158 and the second virtual mating-surface 160. However, if the resulting vectors exceed a maximum allowable shim thickness, the vectors may be scaled to prevent the shims from creating a nonconforming condition.

In one or more examples, after the first dimensions 146 and the second dimensions 148 have been projected to the 2D shim profiles, the first virtual shim-surface 108 and the second virtual shim-surface 110 are fitted to the projected space. More specifically, once the first group of vectors are mapped to their respective 2D shim profile, their end points are used to construct the first virtual shim-surface 108 and the first virtual planar surface 192. The first virtual shim-surface 108 is fitted to the first virtual mating-surface 158 and represents a first contoured shim-surface 212 of one of the final machined surfaces of the double-contoured shim 200. Similarly, once the second group of vectors are mapped to their respective 2D shim profile, their end points are used to construct the second virtual shim-surface 110 and the second virtual planar surface 194. The second virtual shim-surface 110 is fitted to the second virtual mating-surface 160 and represents a second contoured shim-surface 214 of one of the final machined surfaces of the double-contoured shim 200.

Figure 7:
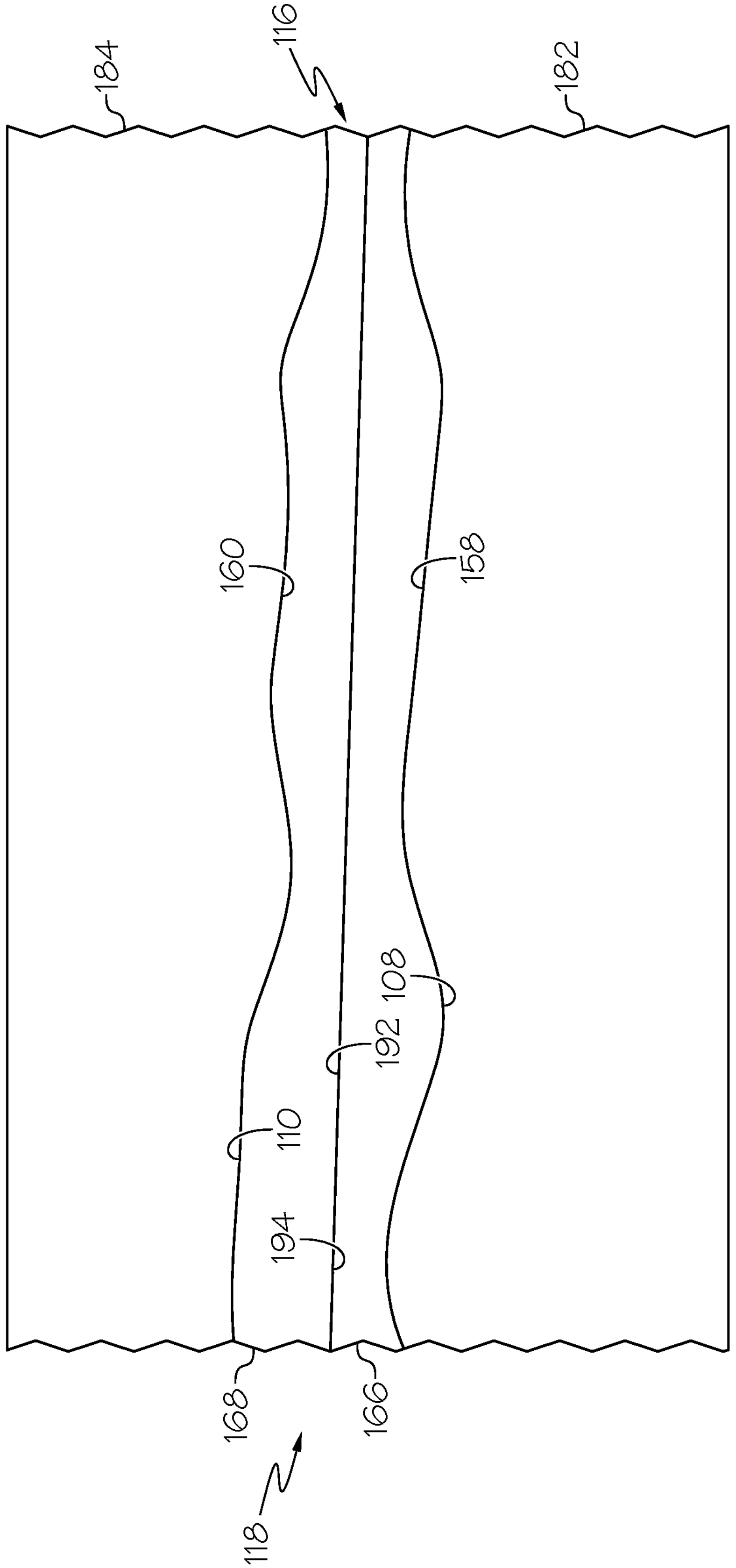
FIG. 7 is a schematic illustration of an example of a portion of the first virtual component and the second virtual component aligned in the assembled condition and with first shim model and a second shim model that substantially fill a space between the first virtual mating-surface and the second virtual mating-surface.

Referring now to FIG. 7, which schematically illustrates an example of a portion of the first virtual component 182 and the second virtual component 184 as aligned. The space 116 between the first virtual mating-surface 158 and the second virtual mating-surface 160 is substantially filled by the shim model 118. The shim model 118 includes the first shim model 166 and the second shim model 168. The first shim model 166 substantially fills the first portion 162 of the space 116 between the virtual plane 142 (FIG. 6) and the first virtual mating-surface 158. The second shim model 168 substantially fills the second portion 164 of the space 116 between the virtual plane 142 and the second virtual mating-surface 160. The first shim model 166 includes the first virtual shim-surface 108, the first virtual planar surface 192, and the first dimensions 146. The second shim model 168 includes the second virtual shim-surface 110, the second virtual planar surface 194, and the second dimensions 148. The first virtual shim-surface 108 is fitted to, is complementary to, and/or substantially matches the first virtual mating-surface 158. The first virtual planar surface 192 is fitted to the virtual plane 142. The second virtual shim-surface 110 is fitted to, is complementary to, and/or substantially matches the second virtual mating-surface 160. The second virtual planar surface 194 is fitted to the virtual plane 142.

Referring again to FIGS. 12 and 13, in one or more examples, first fabrication data 196 representing first shim model 166, including the first virtual shim-surface 108, the first virtual planar surface 192, and the first dimensions 146, are packages and used to fabricate the first shim 224. Second fabrication data 198 representing second shim model 168, including the second virtual shim-surface 110, the second virtual planar surface 194, and the second dimensions 148, are packages and used to fabricate the second shim 226. The packaged fabrication data and shim profiles are then uploaded to a fabrication queue. The first shim 224 (FIG. 8) is fabricated based on the first shim model 166 (FIG. 7). The second shim 226 (FIG. 9) is fabricated based on the second shim model 168 (FIG. 7). Once the first shim 224 and the second shim 226 have been fabricated, the first shim 224 and the second shim 226 are coupled together to form the double-contoured shim 200 (FIG. 10). The double-contoured shim 200 is then delivered to a work cell where it is installed with the structure 236 to fill the gap 210 (FIG. 11). This process can be repeated for each gap 210 to be shimmed.

Figure 8:
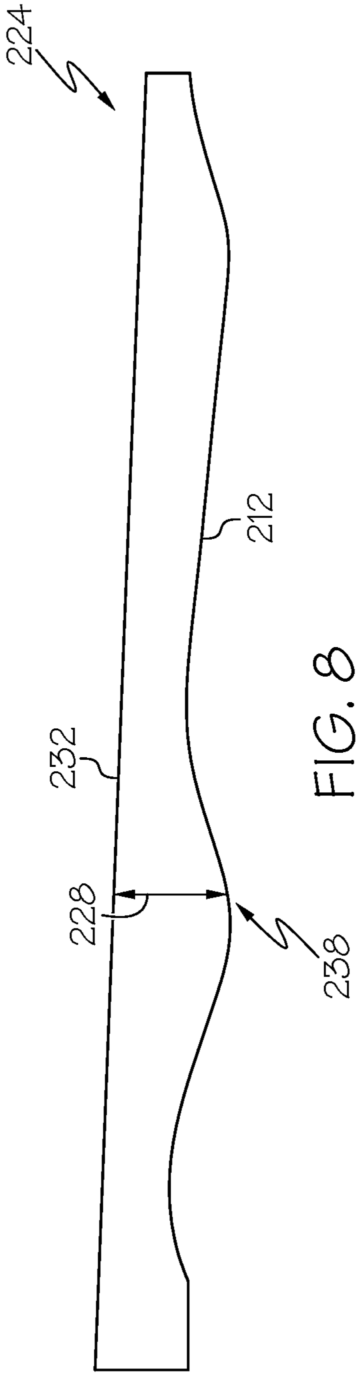
FIG. 8 is a schematic illustration of an example of a first shim fabricated based on the first shim model.
Figure 9:
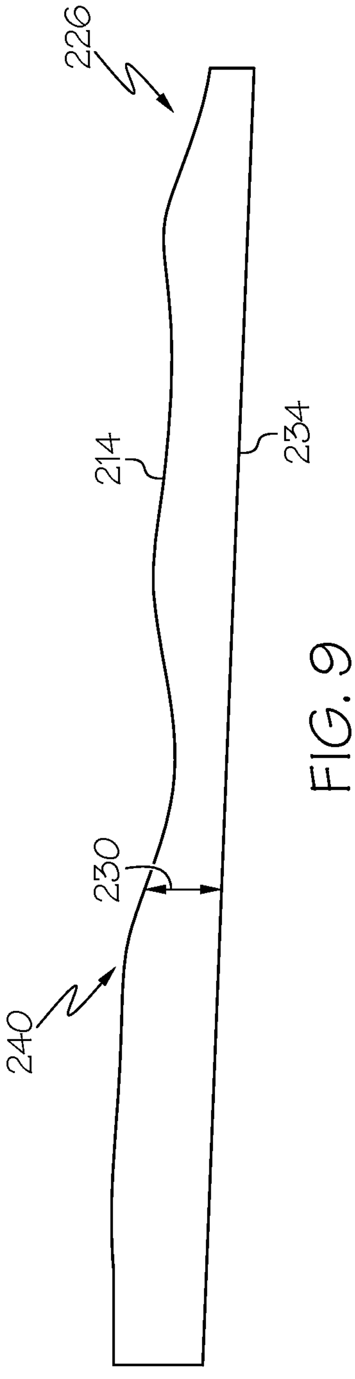
FIG. 9 is a schematic illustration of an example of a second shim fabricated based on the second shim model.
Figure 10:
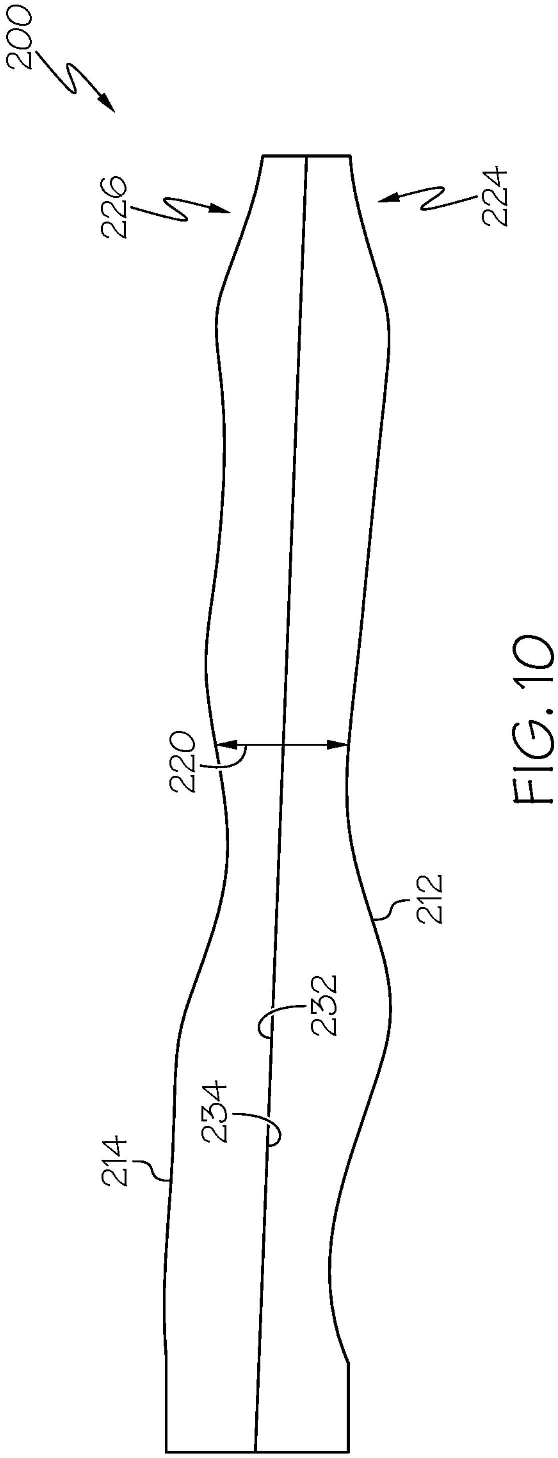
FIG. 10 is a schematic illustration of an example of a double-contoured shim fabricated using the first shim and the second shim.
Figure 11:
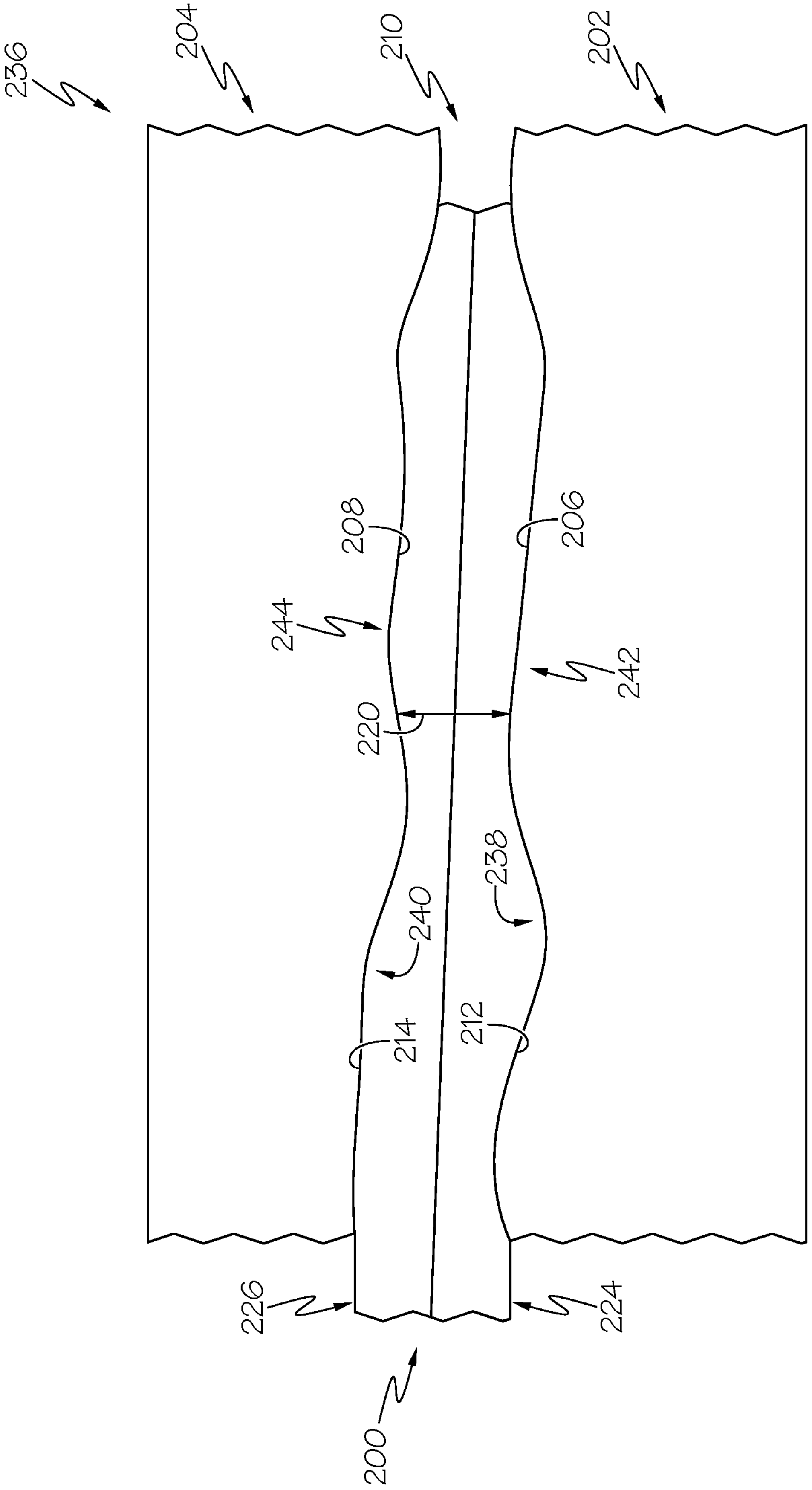
FIG. 11 is a schematic, section view, of an example of a portion of the structure in the assembled condition and depicting a gap between the first component and the second component substantially filled by the double-contoured shim.

Referring now to FIGS. 8-11. FIG. 8 schematically illustrates an example of the first shim 224 fabricated according to the examples described herein. FIG. 9 schematically illustrates an example of the second shim 226 fabricated according to the examples described herein. FIG. 10 schematically illustrates an example of the double-contoured shim 200 fabricated using the first shim 224 and the second shim 226. FIG. 11 schematically illustrates a portion of the structure 236 in a finally assembled condition in which the gap 210 between the first component 202 and the second component 204 is substantially filled using the double-contoured shim 200.

The first shim 224 is fabricated to include the first contoured shim-surface 212, a first planar shim-surface 232, and a first thickness 228. The second shim 226 is fabricated to include the second contoured shim-surface 214, a second planar shim-surface 234, and a second thickness 230. Once the first shim 224 and the second shim 226 have been fabricated, the first shim 224 and the second shim 226 are joined along the first planar shim-surface 232 and the second planar shim-surface 234 to form the double-contoured shim 200. The double-contoured shim 200 is installed within the gap 210 between the first component 202 and the second component 204 during final assembly of the structure 236.

Referring now to FIGS. 12A and 12B, in the illustrated examples, the first component 202 and the second component 204 are coupled together along a joint between the first mating-surface 206 of the first component 202 and the second mating-surface 208 of the second component 204. The double-contoured shim 200 is manufactured to substantially fill the gap 210 between the first mating-surface 206 of the first component 202 and the second mating-surface 208 of the second component 204.

For the purpose of the present disclosure, a "component" refers to any manufactured or fabricated part, object, article, and the like that is intended to be coupled to another component during assembly and/or manufacture of a larger structure. In an aerospace example, components can include, but are not limited to, skin panels, stiffeners, stringers, ribs, frames, and the like, which are joined and/or assembled to form a fuselage barrel, a wing, a stabilizer, and the like. For the purpose of the present disclosure, a "surface" may be a continuous surface, or a discontinuous surface that includes or is made up of multiple surfaces. For the purpose of the present disclosure, a "mating-surface" refers to a surface intended to be placed adjacent to and/or in intimate contact with another surface to form a joint between surfaces.

As illustrated in FIGS. 12A and 12B, in one or more examples, the first component 202 and the second component 204 are components of the assembled structure 236 and are intended to be joined together during final assembly of the structure 236, such as a fuselage barrel section or a wing of an aircraft. The first component 202 and the second component 204 can be made of any suitable material, such as, but not limited to, metallic and metallic alloy materials, composite materials (e.g., fiber reinforced polymer materials), polymeric and plastic materials, combinations thereof, and the like. In some examples, the first component 202 and the second component 204 are made of the same or similar materials. In some examples, the first component 202 and the second component 204 are made of different materials. The first component 202 and the second component 204 can be coupled or joined via any one of various mating or joining processes, including, but not limited to, bonding, welding, fastening, pinning, adhering, and the like.

In one or more examples, prior to assembly, at least a portion of the first mating-surface 206 of the first component 202 and at least a portion of the second mating-surface 208 of the second component 204 are measured. Examples of the system 100 and the method 1000 described herein utilize a metrology-directed method coupled and a predictive shimming method using a suite of metrology and three-dimensional (3D) CAD tools. Predictive shimming is achieved by virtually fitting the first component 202 and the second component 204 per engineering requirements and filling any instances of the gap 210 (e.g., one or more gaps) that exist between the first mating-surface 206 and the second mating-surface 208 with a filler that accommodates surface contours of both first mating-surface 206 and the second mating-surface 208.

In one or more examples, certain operations described herein as being performed by the system 100, such as various data-processing operations used to analyze measurement data and generate design geometries for the double-contoured shim 200, are performed using a computer 128. In one or more examples, the computer 128 serves as an analysis and design environment and is programmed to perform various operations of the system 100. In one or more examples, the computer 128 executes one or more software programs or applications. In one or more examples, the computer 128 includes a data processing system 900 (FIG. 14) that includes a processor 904 and memory 906 having program code 918 stored thereon. In one or more examples, certain operations of the system 100 and/or the method 1000, such as various data-processing operations, are computer implemented, such as being performed by the processor 904 executing the program code 918.

In one or more examples, the system 100 includes a surface generator 102. In one or more examples, the system 100 includes a model generator 112. As will be described in more detail here, the surface generator 102 and/or the model generator 112 are used to design the double-contoured shim 200 having appropriate dimensions and geometry. In one or more examples, the surface generator 102 and/or the model generator 112 are implemented by the computer 128, such as in the form of data-processing modules, program code applications, application software, and the like, which are stored and executed using the data processing system 900.

For the purpose of the present disclosure, general reference to the computer 128 may, in some examples, refer to the data processing system 900, components of the data processing system 900, or data-processing modules and/or program code applications (e.g., the surface generator 102, the model generator 112, and the like) that are implemented or executed by the data processing system 900.

In one or more examples, the system 100 includes a manufacturing system 134. As will be described in more detail herein, the manufacturing system 134 is configured or adapted to fabricate or otherwise manufacture the double-contoured shim 200.

In one or more examples, the system 100 includes measurement system 136. As will be described in more detail herein, the measurement system 136 is configured or adapted to take measurements and/or generate the measurement data 180 used by the system 100, such as the computer 128, to generate the design geometry for the double-contoured shim 200.

In one or more examples, the computer 128 (e.g., the model generator 112) is programmed to generate a shim model 118. The shim model 118 is representative of the double-contoured shim 200. The shim model 118 is designed or generated such that the double-contoured shim 200 fabricated based on the shim model 118 includes an appropriate size, shape, and geometry to substantially fill the gap 210 between the first mating-surface 206 of the first component 202 and the second mating-surface 208 of the second component 204. The shim model 118 is designed or generated such that the double-contoured shim 200 fabricated based on the shim model 118 includes opposing surfaces having contours that mate with or substantially match contours of the first mating-surface 206 and the second mating-surface 208.

In one or more examples, the computer 128 (e.g., the model generator 112) is programmed to generate the virtual plane 142. The virtual plane 142 divides the shim model 118 into the first shim model 166 and the second shim model 168.

In one or more examples, the manufacturing system 134 fabricates the first shim 224. The first shim 224 is based on the first shim model 168. The first shim 224 includes the first contoured shim-surface 212 and the first planar shim-surface 232. The first contoured shim-surface 212 is complementary to or substantially matches at least a first portion, such as a first mating-surface area 216 as represented by a first virtual-surface portion 170, of the first mating-surface 206. The first planar shim-surface 232 is opposite the first contoured shim-surface 212.

In one or more examples, the manufacturing system 134 fabricates the second shim 226. The second shim 226 is based on the second shim model 168. The second shim 226 includes the second contoured shim-surface 214 and the second planar shim-surface 234. The second contoured shim-surface 214 is complementary to or substantially matches at least a second portion, such as a second mating-surface area 218 as represented by a second virtual-surface portion 172, of the second mating-surface 208. The second planar shim-surface 234 is opposite the second contoured shim-surface 214.

In one or more examples, the computer 128 (e.g., the model generator 112) is programmed to generate three-dimensional geometry data 114 for the space 116 between the first virtual mating-surface 158 and the second virtual mating-surface 160.

In one or more examples, the virtual plane 142 divides the space 116 into the first portion 162 and the second portion 164. The first shim model 166 substantially fills the first portion 162 of the space 116 between the virtual plane 142 and the first virtual mating-surface 158. The second shim model 168 substantially fills the second portion 164 of the space 116 between the virtual plane 142 and the second virtual mating-surface 160.

In one or more examples, the computer 128 (e.g., the surface generator 102) is programmed to align the first measurement data 104 of the first mating-surface 206 and the second measurement data 106 of the second mating-surface 208.

In one or more examples, the computer 128 (e.g., the surface generator 102) is programmed to generate the first virtual shim-surface 108 based on the three-dimensional geometry data 114, for example, from the first measurement data 104, that is fitted to, is complementary to, or that substantially matches the first virtual-surface portion 170 of the first virtual mating-surface 158. In one or more examples, the computer 128 (e.g., the surface generator 102) is programmed to generate the second virtual shim-surface 110 based on the three-dimensional geometry data 114, for example, from the second measurement data 106, that is fitted to, is complementary to, or that substantially matches the second virtual-surface portion 172 of the second virtual mating-surface 160.

In one or more examples, the computer 128 (e.g., the model generator 112) is programmed to generate (e.g., calculate or estimate) the first dimensions 146 of the first portion 162 of the space 116 between the first virtual shim-surface 108 and the virtual plane 142. In one or more examples, the computer 128 (e.g., the model generator 112) is programmed to generate (e.g., calculate or estimate) the second dimensions 148 of the second portion 164 of the space 116 between the second virtual shim-surface 110 and the virtual plane 142.

In one or more examples, the manufacturing system 134 fabricates the first shim 224 that includes the first thickness 228. The first thickness 228 varies as a function of the first dimensions 146. In one or more examples, the manufacturing system 134 fabricates the second shim 226 that includes the second thickness 230. The second thickness 230 varies as a function of the second dimensions 148.

In one or more examples, the computer 128 (e.g., the model generator 112) is programmed to generate a planar data set 144 that corresponds to the virtual plane 142. The planar data set 144 is an example of the third grid of points 190 generated on the virtual plane 142.

In one or more examples, the computer 128 (e.g., the model generator 112) is programmed to determine the first dimensions 146 between the planar data set 144 and the first virtual shim-surface 108, such as between the third grid of points 190 and the first grid of points 186, for use as the first thickness 228 of the first shim 224.

In one or more examples, the computer 128 (e.g., the model generator 112) is programmed to determine the second dimensions 148 between the planar data set 144 and the second virtual shim-surface 110, such as between the third grid of points 190 and the second grid of points 188, for use as the second thickness 230 of the second shim 226.

In one or more examples, the computer 128 (e.g., the model generator 112) is programmed to select the planar data set 144 at an approximately central location between the first virtual shim-surface 108 and the second virtual shim-surface 110. However, the virtual plane 142 and, thus, the planar data set 144 can be situated in non-central location as needed to satisfy a maximum or minimum thickness requirement for either of the first shim 224 and/or the second shim 226.

In one or more examples, the computer 128 (e.g., the model generator 112) determines the dimensions 120 of the space 116 between the first virtual shim-surface 108 and the second virtual shim-surface 110. The double-contoured shim 200 includes the thickness 220 that varies as a function of the dimensions 120 of the space 116.

In one or more examples, the computer 128 (e.g., the model generator 112) is programmed to determine the first virtual shim-surface contour 122 of the first virtual shim-surface 108. In one or more examples, the computer 128 (e.g., the model generator 112) is programmed to the second virtual shim-surface contour 124 of the second virtual shim-surface 110.

In one or more examples, the manufacturing system 134 fabricates the first contoured shim-surface 212 of the first shim 224 that includes the first shim-surface contour 238. The first shim-surface contour 238 varies as a function of the first virtual shim-surface contour 122.

In one or more examples, the manufacturing system 134 fabricates the second contoured shim-surface 214 of the second shim 226 that includes the second shim-surface contour 240. The second shim-surface contour 240 varies as a function of the second virtual shim-surface contour 124.

In one or more examples, the measurement system 136 generates the first measurement data 104. In one or more examples, the measurement system 136 generates the second measurement data 106. In one or more examples, the measurement system 136 is a metrology system. In one or more examples, the measurement system 136 includes one or more instances of the scanner 174 (e.g., a plurality of scanners) and/or one or more instances of the probe 176 (e.g., a plurality of probes).

In one or more examples, the shim model 118, such as the first shim model 166 and the second shim model 168, are based on the measurement data 180 collected by the measurement system 136 from the components to be shimmed. In one or more examples, the measurement system 136 includes an optical 3D coordinate measuring machine that is configured to measure (e.g., in its own frame of reference) 3D coordinates of optically reflective elements in its field of view and then store a high-density point cloud representing the scanned surface. In one or more examples, the measurement system 136 includes a plurality of scanners and/or probes that are used to acquire positional data (e.g., X,Y,Z-coordinate data) that can be used to compute the locations surfaces of the components in the frame of reference of the 3D coordinate measuring machine. In one or more examples, a control computer (e.g., the computer 128) is configured to receive point cloud data from the optical 3D coordinate measuring machine and also receive commands and data input by a system operator via a user interface. In one or more examples, the computer 128 is configured (e.g., programmed) to perform at least some of the steps identified in the method 1000 (FIG. 13).

In one or more examples, the computer 128 (e.g., the surface generator 102) is programmed to align the first measurement data 104 with first nominal-location data 138 and aligns the second measurement data 106 with second nominal-location data 140. In one or more examples, the first nominal-location data 138 and the second nominal-location data 140 are in the form of the engineering model that specifies the locations of the first component 202 and the second component 204 in the final assembly of the structure 236.

In one or more examples, the computer 128 (e.g., the surface generator 102) is programmed to select a first data set 130 of the first measurement data 104 that corresponds to the first mating-surface area 216 of the first mating-surface 206. The first data set 130 is used to generate at least one of the first virtual mating-surface 158 and/or the first virtual shim-surface 108. In one or more examples, the first data set 130 is an example of the first grid of points 186.

In one or more examples, the computer 128 (e.g., the surface generator 102) is programmed to select a second data set 132 of the second measurement data 106 that corresponds to the second mating-surface area 218 of the second mating-surface 208. The second data set 132 is used to generate at least one of the second virtual mating-surface 160 and/or the second virtual shim-surface 110. In one or more examples, the second data set 132 is an example of the second grid of points 188.

In one or more examples, the manufacturing system 134 includes or takes the form of a subtractive manufacturing system 156. Examples of the subtractive manufacturing system 156 include machines configured for lathe-turning, milling, drilling, boring, sawing, grinding, sanding, routing, and any other appropriate machining process that involves shaping a workpiece by removing material.

In one or more examples, the manufacturing system 134 includes or takes the form of an additive manufacturing system 154. Examples of the additive manufacturing system 154 include machines configured for material extrusion, binder jetting, material jetting, directed energy deposition, powder bed fusion, and any other one or more of various processes in which material is deposited, joined, or solidified under computer control, with material being added together, typically layer-by-layer, and construction of the three-dimensional object being based from a CAD model or a digital 3D model.

In either of the above examples, the first contoured shim-surface 212 of the first shim 224 is the machined side of the first shim 224 for mating with the first mating-surface 206 of the first component 202 and the first planar shim-surface 232 is the flat side of the first shim 224 for joining to the second shim 226. The second contoured shim-surface 214 of the second shim 226 is the machined side of the second shim 226 for mating with the second mating-surface 208 of the second component 204 and the second planar shim-surface 234 is the flat side of the second shim 226 for joining to the second shim 226.

In one or more examples, the manufacturing system 134 manufactures the double-contoured shim 200 as two filler members, such as the first shim 224 and the second shim 226. The first shim 224 includes the first thickness 228, the first contoured shim-surface 212, and the first planar shim-surface 232 that is opposite the first contoured shim-surface 212. The second shim 226 includes the second thickness 230, the second contoured shim-surface 214, and the second planar shim-surface 234 that is opposite the second contoured shim-surface 214.

In one or more examples, the manufacturing system 134 couples the first shim 224 and the second shim 226 together along the first planar shim-surface 232 and the second planar shim-surface 234. In one or more examples, the manufacturing system 134 applies an adhesive to at least one of the first planar shim-surface 232 and the second planar shim-surface 234 to couple the first shim 224 and the second shim 226 together.

In an alternate example, the manufacturing system 134, such as the additive manufacturing system 154, manufactures the double-contoured shim 200 as a single filler member. The single filler member of the double-contoured shim 200 includes the thickness 220, the first contoured shim-surface 212 including the first shim-surface contour 238, and the second contoured shim-surface 214 including the second shim-surface contour 240.

Referring now to FIG. 13, in one or more examples, the method 1000 for fabricating the double-contoured shim 200 utilizes a predictive shimming process. In one or more examples, the method 1000 is implemented using the system 100. In one or more examples, certain ones of the operations of the method 1000 are performed using the computer 128. As such, in one or more examples, at least a portion of the method 1000 is computer-implemented method.

In one or more examples, the method 1000 includes a step of (block 1002) measuring the first mating-surface 206 of the first component 202. In one or more examples, measurements of the first mating-surface 206 are taken and the measurement data 180 is generated using the measurement system 136. In one or more examples, the method 1000 includes a step of (block 1004) measuring the second mating-surface 208 of the second component 204. In one or more examples, measurements of the second mating-surface 208 are taken and the measurement data 180 is generated using the measurement system 136.

In one or more examples, the method 1000 includes a step of (block 1006) generating the first measurement data 104. In one or more examples, the first measurement data 104 is taken from the measurement data 180 and/or is generated based on the measurements of the first mating-surface 206 using the measurement system 136 and/or the computer 128. In one or more examples, the method 1000 includes a step of (block 1008) generating the second measurement data 106. In one or more examples, the second measurement data 106 is taken from the measurement data 180 and/or is generated based on the measurements of the second mating-surface 208 using the measurement system 136 and/or the computer 128.

In one or more examples, the method 1000 includes a step of (block 1010) aligning the first measurement data 104 of the first mating-surface 206 and the second measurement data 106 of the second mating-surface 208. In an example, the step of (block 1010) aligning includes a step of (block 1012) aligning the first measurement data 104 with the first nominal-location data 138, for example, as represented by an engineering or nominal model of the first component 202 in the fully assembled condition. In one or more examples, the step of (block 1010) aligning includes a step of (block 1014) aligning the second measurement data 106 with second nominal-location data 140. for example, as represented by an engineering or nominal model of the first component 202 in the fully assembled condition.

In one or more examples, the method 1000 includes a step of (block 1016) filtering the measurement data 180. As an example, the measurement data 180 is filtered, trimmed, or is otherwise reduced for more efficient and accurate data processing results. In one or more examples, the measurement data 180, such as the first measurement data 104 and the second measurement data 106, are filtered and/or trimmed after alignment (e.g., block 1010).

In one or more examples, the method 1000 includes a step of (block 1018) generating the three-dimensional geometry data 114. In one or more examples, the three-dimensional geometry data 114 is representative of the space 116 between the first virtual mating-surface 158 and the second virtual mating-surface 160. In one or more examples, the three-dimensional geometry data 114 is representative of the shim model 118 that fills the space 116 between the first virtual mating-surface 158 and the second virtual mating-surface 160.

In one or more examples, the method 1000 includes a step of (block 1020) generating the shim model 118. In one or more examples, the shim model 118 is generated using the three-dimensional geometry data 114. However, the shim model 118 can be generated in any one of various techniques, such as using a predictive shimming process. While certain illustrative example techniques are described herein, other three-dimensional modelling and/or data processing techniques can be used to determine the three-dimensional geometry of the space 116 between the first virtual mating-surface 158 and the second virtual mating-surface 160, the first virtual shim-surface contour 122 of the first virtual shim-surface 108, the second virtual shim-surface contour 124 of the second virtual shim-surface 110, the dimensions 120 between such surfaces, and the like. The shim model 118 is a digital representation of the double-contoured shim 200 needed to substantially fill the space 116 between the first virtual mating-surface 158 and the second virtual mating-surface 160 of the first virtual component 182 and the second virtual component 184 after alignment (e.g., block 1010). The shim model 118 is designed or generated such that the double-contoured shim 200 fabricated based on the shim model 118 includes an appropriate size, shape, and geometry to substantially fill the gap 210 between the first mating-surface 206 of the first component 202 and the second mating-surface 208 of the second component 204 when the structure 236 is fully assembled. The shim model 118 is designed or generated such that the double-contoured shim 200 fabricated based on the shim model 118 includes opposing surfaces having contours that mate with or substantially match contours of the first mating-surface 206 and the second mating-surface 208.

In one or more examples, the method 1000 includes a step of (block 1022) generating the virtual plane 142. In one or more examples, according to the method 1000, the virtual plane 142 divides the shim model 118 into the first shim model 166 and the second shim model 168. In one or more examples, according to the method 1000, the virtual plane 142 divides the space 116 into the first portion 162 and the second portion 164. In these examples, the first shim model 166 substantially fills the first portion 162 of the space 116 between the virtual plane 142 and the first virtual mating-surface 158. The second shim model 168 substantially fills the second portion 164 of the space 116 between the virtual plane 142 and the second virtual mating-surface 160.

In one or more examples, the method 1000, such as the step of (block 1022) generating the virtual plane 142, includes a step of generating the planar data set 144 that corresponds to the virtual plane 142. As an example, the planar data set 144 is representative of the third grid of points 190 generated on the virtual plane 142. In one or more examples, the first dimensions 146 are generated (e.g., block 1026) between the planar data set 144 and the first virtual shim-surface 108 and are used as or to represent the first thickness 228 of the first shim 224. Similarly, the second dimensions 148 are generated (e.g., block 1028) between the planar data set 144 and the second virtual shim-surface 110 and are used as or to represent the second thickness 230 of the second shim 226.

In one or more examples, the method 1000 includes a step of selecting the planar data set 144 at an approximately central location between the first virtual shim-surface 108 and the second virtual shim-surface 110.

In one or more examples, the method 1000 includes a step of (block 1024) generating the first virtual shim-surface 108. In one or more examples, the first virtual shim-surface 108 is generated from the first measurement data 104. The first virtual shim-surface 108 is complementary to or substantially matches the first virtual-surface portion 170 of the first virtual mating-surface 158. In one or more examples, the method 1000 includes a step of (block 1026) generating the second virtual shim-surface 110. In one or more examples, the second virtual shim-surface 110 is generated from the second measurement data 106. The second virtual shim-surface 110 is complementary to or substantially matches the second virtual-surface portion 172 of the second virtual mating-surface 160.

In one or more examples, the method 1000 includes a step of determining the first virtual shim-surface contour 122 of the first virtual shim-surface 108. In one or more examples, the method 1000 includes a step of determining the second virtual shim-surface contour 124 of the second virtual shim-surface 110. In one or more examples, the method 1000 includes a step of selecting the first data set 130 of the first measurement data 104 that corresponds to the first mating-surface area 216 of the first mating-surface 206 to generate the first virtual shim-surface 108 and/or to determine the first virtual shim-surface contour 122 of the first virtual shim-surface 108. In one or more examples, the method 1000 includes a step of selecting the second data set 132 of the second measurement data 106 that corresponds to the second mating-surface area 218 of the second mating-surface 208 to generate the second virtual shim-surface 110 and/or to determine the first virtual shim-surface contour 122 of the first virtual shim-surface 108.

In one or more examples, the method 1000 includes a step of (block 1028) generating the first dimensions 146. The first dimensions 146 are representative of the geometry of the dimensions of the first portion 162 of the space 116 between the first virtual shim-surface 108 and the virtual plane 142. In one or more examples, the method 1000 includes a step of (block 1030) generating the second dimensions 148. The second dimensions 148 are representative of the second portion 164 of the space 116 between the second virtual shim-surface 110 and the virtual plane 142.

In one or more examples, the method 1000 includes a step of (block 1032) manufacturing the double-contoured shim 200. In one or more examples, according to the method 1000, the step of (block 1032) manufacturing the double-contoured shim 200 includes subtractively manufacturing the double-contoured shim 200. In one or more examples, according to the method 1000, the step of (block 1032) manufacturing the double-contoured shim 200 includes additively manufacturing the double-contoured shim 200.

In one or more examples, according to the method 1000, the step of (block 1032) manufacturing includes a step of (block 1034) fabricating the first shim 224. The first shim 224 is fabricated based on the first shim model 168. The first shim 224 includes the first contoured shim-surface 212. The first contoured shim-surface 212 is complementary to or substantially matches the first mating-surface area 216 of the first mating-surface 206. The first shim 224 also includes the first planar shim-surface 232. The first planar shim-surface 232 is opposite the first contoured shim-surface 212.

In one or more examples, according to the method 1000, the step of (block 1032) manufacturing includes a step of (block 1036) fabricating the second shim 226. The second shim 226 is fabricated based on the second shim model 168. The second shim 226 includes the second contoured shim-surface 214. The second contoured shim-surface 214 is complementary to or substantially matches the second mating-surface area 218 of the second mating-surface 208. The second shim 226 also includes the second planar shim-surface 234. The second planar shim-surface 234 is opposite the second contoured shim-surface 214.

In one or more examples, according to the method 1000, the first shim 224 is fabricated to include the first thickness

228. The first thickness 228 varies as a function of the first dimensions 146. In one or more examples, according to the method 1000, the second shim 226 is fabricated to include the second thickness 230. The second thickness 230 varies as a function of the second dimensions 148.

In one or more examples, according to the method 1000, the first shim 224 is fabricated to include the first contoured shim-surface 212 of the first shim 224 and the first planar shim-surface 232. The first contoured shim-surface 212 includes the first shim-surface contour 238. The first shim-surface contour varies as a function of the first virtual shim-surface contour 122. In one or more examples, according to the method 1000, the second shim 226 is fabricated to include the second contoured shim-surface 214 and the second planar shim-surface 234. The second contoured shim-surface 214 includes the second shim-surface contour 240. The second shim-surface contour 240 varies as a function of the second virtual shim-surface contour 124.

In one or more examples, according to the method 1000, the first shim 224 and/or the second shim 226 can be additively manufactured. In one or more examples, according to the method 1000, the first shim 224 and/or the second shim 226 can be substractively manufactured.

In one or more examples, according to the method 1000, the step of (block 1032) manufacturing includes a step of (block 1038) coupling the first shim 224 and the second shim 226 together. The first shim 224 and the second shim 226 are coupled together along the first planar shim-surface 232 and the second planar shim-surface 234. In one or more examples, according to the method 1000, the step of (block 1032) coupling the first shim 224 and the second shim 226 together, includes a step of adhesively bonding the first planar shim-surface 232 and the second planar shim-surface 234 together.

In one or more examples, the method 1000 includes a step of determining a minimum allowable dimension 150 for each one of the first dimensions 146 of the first shim 224 and the second dimensions 148 of the second shim 226. In one or more examples, the method 1000 includes a step of determining a maximum allowable dimension 152 for each one of the first dimensions 146 of the first shim 224 and/or the second dimensions 148 of the second shim 226. In one or more examples, the location of the virtual plane 142 between and relative to the first virtual mating-surface 158 and the second virtual mating-surface 160 and/or between and relative to the first virtual shim-surface 108 and the second virtual shim-surface 110 can be selected and/or adjusted based on the maximum allowable dimension 152 and the minimum allowable dimension 150.

Figure 14:
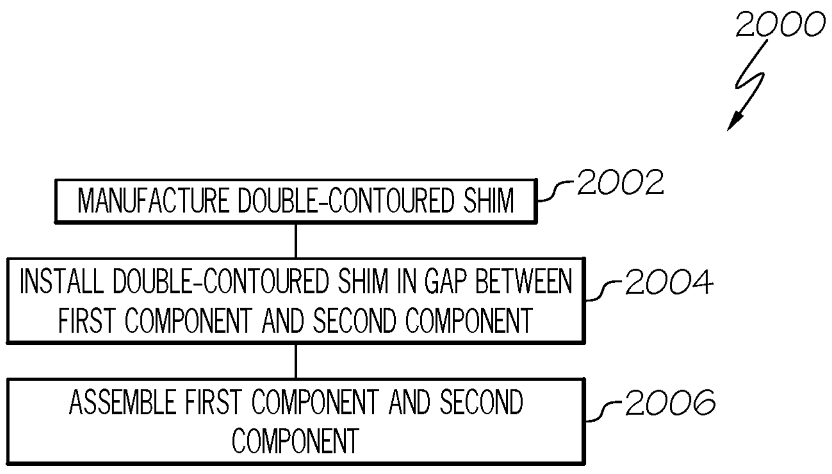
FIG. 14 is a flow diagram of an example of a method for shimming.

Referring now to FIG. 14, by way of examples, the present disclosure is also directed to a method 2000 for shimming. Example implementations of the method 2000 utilize the double-contoured shim 200, which is designed and fabricated using the system 100 and/or according to the method 1000.

In one or more examples, the method 2000 includes a step of (block 2002) manufacturing the double-contoured shim 200. In one or more examples, the step of (block 2002) manufacturing includes designing and fabricating the double-contoured shim 200 according to the method 1000 and/or using the system 100. Any number of the double-contoured shim 200 can be fabricated depending on and corresponding to the number of instances of the gap 210 between the first mating-surface 206 of the first component 202 and the second mating-surface 208 of the second component 204. In one or more examples, the method 2000 includes a step of (block 2004) installing the double-contoured shim 200 in the gap 210 between the first mating-surface 206 of the first component 202 and the second mating-surface 208 of the second component 204. In one or more examples, the method 2000 includes a step of (block 2006) assembling the first component 202, the second component 204, and the double-contoured shim 200 to form the finally assembled structure 236.

Referring now to FIGS. 8-12, by way of examples, the present disclosure is also directed to the double-contoured shim 200. The double-contoured shim 200 is configured for filling the gap 210 between the first mating-surface 206 of the first component 202 and the second mating-surface 208 of the second component 204.

In one or more examples, the double-contoured shim 200 includes the first shim 224 and the second shim 226. The first shim 224 includes the first thickness 228, the first contoured shim-surface 212, and the first planar shim-surface 232. The first contoured shim-surface 212 is complementary to or substantially matches a first mating-surface contour 242 of the first mating-surface 206 of the first component 202. The first planar shim-surface 232 is opposite the first contoured shim-surface 212. The second shim 226 includes the second thickness 230, the second contoured shim-surface 214, and the second planar shim-surface 234. The second contoured shim-surface 214 is complementary to or substantially matches a second mating-surface contour 244 of the second mating-surface 208 of the second component 204. The second planar shim-surface 234 is opposite the second contoured shim-surface 214. The first shim 224 and the second shim 226 are coupled together along the first planar shim-surface 232 and the second planar shim-surface 234.

Accordingly, in one or more examples, the double-contoured shim 200 includes the first contoured shim-surface 212 and the second contoured shim-surface 214. The second contoured shim-surface 214 is opposite the first contoured shim-surface 212. The double-contoured shim 200 has a thickness 220. The thickness 220 includes the first thickness 228 and the second thickness 230. The first contoured shim-surface 212 is complementary to or substantially matches the first mating-surface contour 242 of the first mating-surface area 216 of the first mating-surface 206. The second contoured shim-surface 214 is complementary to or substantially matches the second mating-surface contour 244 of the second mating-surface area 218 of the second mating-surface 208.

In the illustrative examples, the double-contoured shim 200 is fabricated as two, discrete filler members (e.g., the first shim 224 and the second shim 226) that are coupled together. However, in other examples, the double-contoured shim 200 can be fabricated as a single, unitary filler member. In these examples, the double-contoured shim 200 is fabricated based on the shim model 118 and includes the thickness 220, the first contoured shim-surface 212, and the second contoured shim-surface 214 opposite the first contoured shim-surface 212. For example, the double-contoured shim 200 that includes the thickness 220, the first contoured shim-surface 212, and the second contoured shim-surface 214 can be manufactured as a single, unitary filler member using any one of various additive manufacturing techniques or processes.

Figure 15:
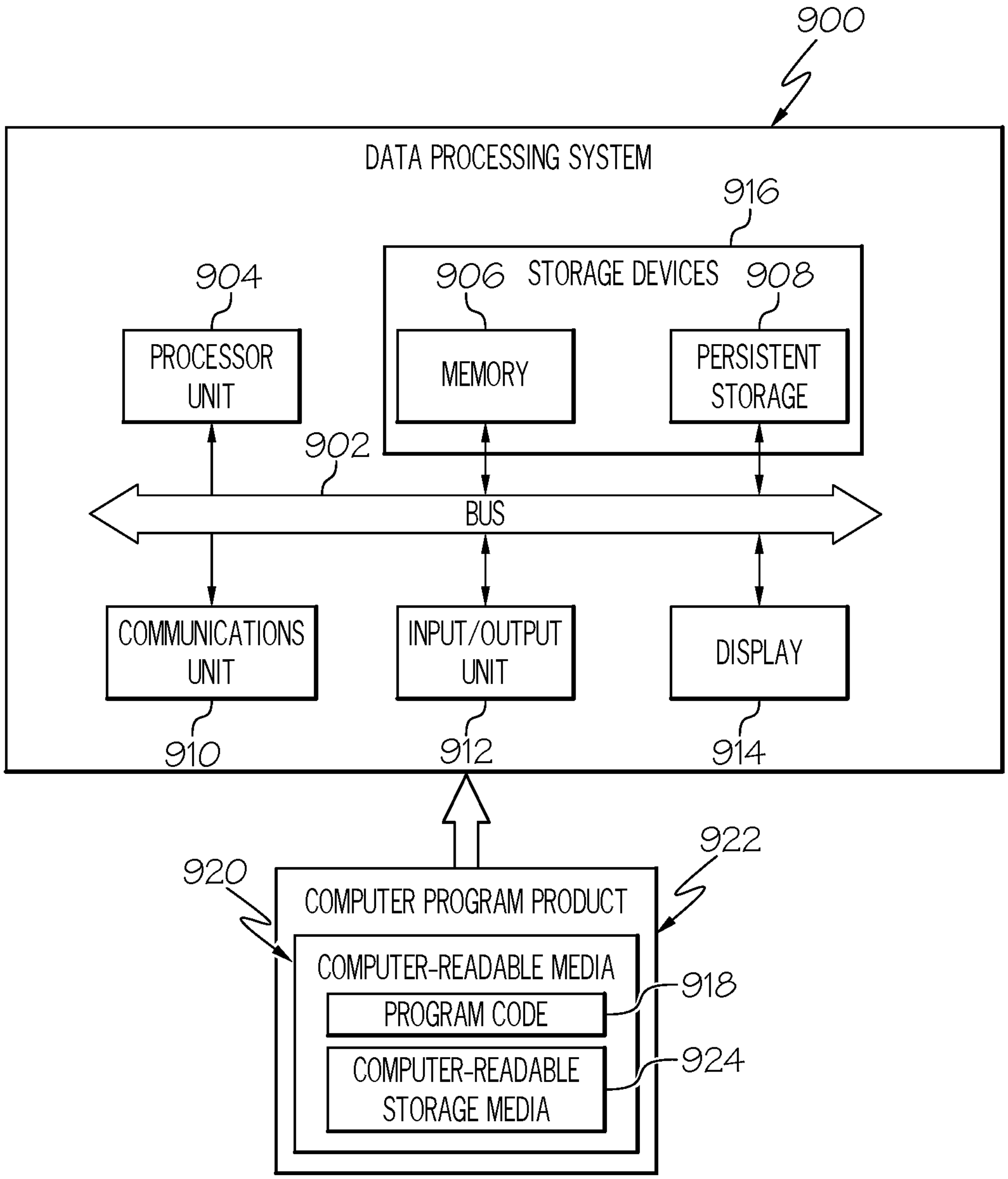
FIG. 15 is a schematic block diagram of an example of a data processing system.

Referring now to FIG. 15, by way of examples, the present disclosure is also directed to the data processing system 900, a computer program product 922, and a computer-readable storage media 924, which are is configured to perform at least some of the operational steps associated with the system 100 (FIGS. 12A and 12B) and the method 1000 (FIG. 13).

In one or more examples, the data processing system 900 is used to implement the system 100. For example, the data processing system 900 may be used to implement computer 128 (FIGS. 12A and 12B). In some cases, the data processing system 900 may be used to implement at least a portion of one or more of the measurement system 136, the surface generator 102, the model generator 112, the manufacturing system 134, and other computer-implemented components of the system 100.

In one or more examples, the data processing system 900 includes a communications framework 902, which provides communications between the processor 904, storage devices 916, a communications unit 910, an input/output unit 912, and a display 914. In some cases, the communications framework 902 is implemented as a bus system.

In one or more examples, the processor 904 is configured to execute instructions for software to perform a number of operations. The processor 904 includes at least one of a number of processors, a multi-processor core, or some other type of processor, depending on the implementation. In some examples, the processor 904 takes the form of a hardware unit, such as a circuit system, an application specific integrated circuit (ASIC), a programmable logic device, or some other suitable type of hardware unit.

In one or more examples, instructions for the operating system, applications, and programs run by the processor 904 are located in the storage devices 916. The storage devices 916 are in communication with the processor 904 through the communications framework 902. As used herein, a storage device, also referred to as a computer-readable storage device, is any piece of hardware capable of storing information on a temporary basis, a permanent basis, or both. This information may include, but is not limited to, data, program code, other information, or some combination thereof.

The memory 906 and persistent storage 908 are examples of the storage devices 916. In one or more examples, the memory 906 takes the form of, for example, a random-access memory or some type of volatile or non-volatile storage device. In one or more examples, the persistent storage 908 includes any number of components or devices. For example, the persistent storage 908 includes a hard drive, a flash memory, a rewritable optical disk, a rewritable magnetic tape, or some combination of the above. The media used by the persistent storage 908 may or may not be removable.

The communications unit 910 allows the data processing system 900 to communicate with other data processing systems, devices, or both. The communications unit 910 may provide communications using physical communications links, wireless communications links, or both.

The input/output unit 912 allows input to be received from and output to be sent to other devices connected to the data processing system 900. For example, the input/output unit 912 may allow user input to be received through a keyboard, a mouse, some other type of input device, or a combination thereof. As another example, the input/output unit 912 may allow output to be sent to a printer connected to the data processing system 900.

The display 914 is configured to display information to a user. The display 914 may include, for example, without limitation, a monitor, a touch screen, a laser display, a holographic display, a virtual display device, some other type of display device, or a combination thereof.

In this illustrative example, the processes of the different illustrative embodiments may be performed by the processor 904 using computer-implemented instructions. These instructions may be referred to as program code, computer-usable program code, or computer-readable program code and may be read and executed by one or more processors in the processor 904.

In these examples, program code 918 is located in a functional form on computer-readable media 920, which is selectively removable, and may be loaded onto or transferred to the data processing system 900 for execution by the processor 904. The program code 918 and the computer-readable media 920 together form the computer program product 922. In this illustrative example, the computer-readable media 920 may be computer-readable storage media 924 or computer-readable signal media.

In one or more examples, the computer-readable storage media 924 is a physical or tangible storage device used to store the program code 918 rather than a medium that propagates or transmits the program code 918. The computer-readable storage media 924 may be, for example, without limitation, an optical or magnetic disk or a persistent storage device that is connected to the data processing system 900.

Alternatively, the program code 918 may be transferred to the data processing system 900 using computer-readable signal media. The computer-readable signal media may be, for example, a propagated data signal containing the program code 918. This data signal may be an electromagnetic signal, an optical signal, or some other type of signal that can be transmitted over physical communications links, wireless communications links, or both.

The illustration of the data processing system 900 in FIG. 14 is not meant to provide architectural limitations to the manner in which the illustrative embodiments may be implemented. The different illustrative examples may be implemented in a data processing system that includes components in addition to or in place of those illustrated for the data processing system 900. Further, components shown in FIG. 14 may be varied from the illustrative examples shown.

Figure 16:
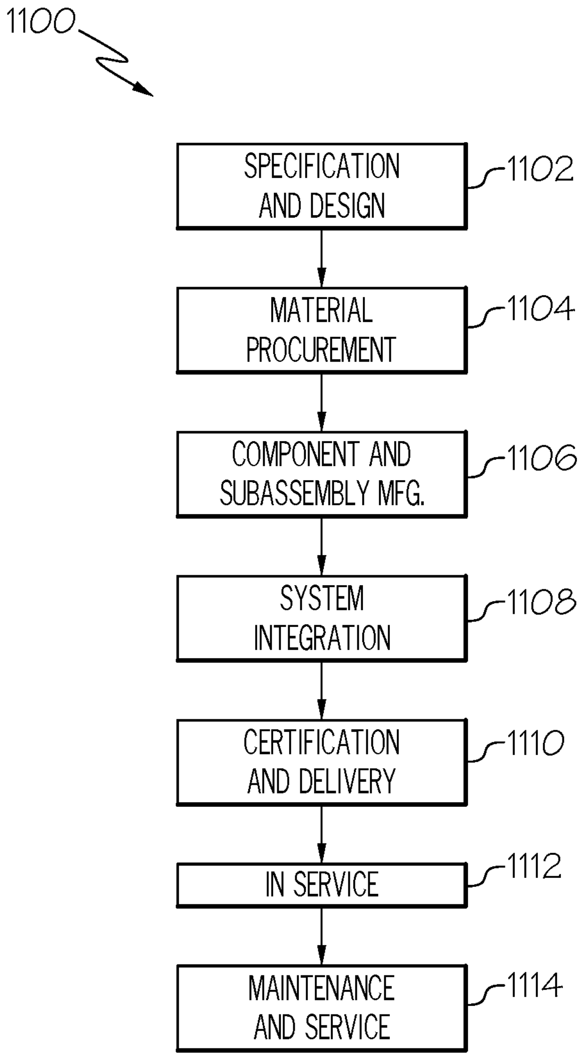
FIG. 16 is a flow diagram of an example of an aircraft manufacturing and service method.
Figure 17:
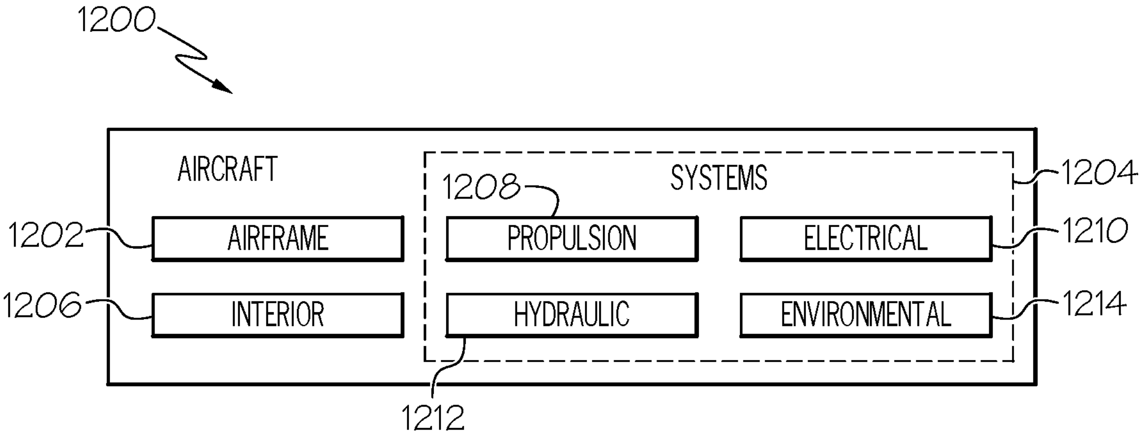
FIG. 17 is a schematic block diagram of an example of an aircraft.

Referring now to FIGS. 16 and 17, examples of the system 100, the method 1000, the double-contoured shim 200, and the method 2000 described herein, may be related to, or used in the context of, an aircraft manufacturing and service method 1100, as shown in the flow diagram of FIG. 16 and an aircraft 1200, as schematically illustrated in FIG. 17. As an example, the aircraft 1200 and/or the aircraft production and service method 1100 may include the assembled structure 236 that includes one or more instances of the double-contoured shim 200 that fills associated instances of the gap 210 between mating surfaces of components, which is manufactured using the system 100 and/or according to the method 1000. As another example, in accordance with one implementation, the system 100 and/or the method 1000 can be used to fabricate the double-contoured shim 200 and the method 2000 can be used to shim a structural component to a skin of the aircraft 1200. Examples of the system 100, the method 1000, and the method 2000 would also be applicable for accurately shimming many different types of structural components on an aircraft or ship. While a primary use of the examples disclosed herein is in the field of aircraft manufacturing and assembly, the teachings herein have application in various other types of construction and assembly, including, for example, shipbuilding, automobile manufacture, building construction and the like.

Referring to FIG. 17, which illustrates an example of the aircraft 1200. The aircraft 1200 includes an airframe 1202 having an interior 1206. The aircraft 1200 includes a plurality of onboard systems 1204 (e.g., high-level systems).

Examples of the onboard systems 1204 of the aircraft 1200 include propulsion systems 1208, hydraulic systems 1212, electrical systems 1210, and environmental systems 1214. In other examples, the onboard systems 1204 also includes one or more control systems coupled to an airframe 1202 of the aircraft 1200, such as for example, flaps, spoilers, ailerons, slats, rudders, elevators, and trim tabs. In yet other examples, the onboard systems 1204 also includes one or more other systems, such as, but not limited to, communications systems, avionics systems, software distribution systems, network communications systems, passenger information/entertainment systems, guidance systems, radar systems, weapons systems, and the like. The aircraft 1200 may include various structural components (e.g., first component 202 and second component 204) that include one or more instances of the double-contoured shim 200, fabricated using the system 100 and/or according to the method 1000.

Referring to FIG. 16, during pre-production of the aircraft 1200, the manufacturing and service method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the manufacturing and service method 1100 illustrated in FIG. 16 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the system 100, the method 1000, the method 2000, and the double-contoured shim 200 shown and described herein, may be employed during any one or more of the stages of the manufacturing and service method 1100 shown in the flow diagram illustrated by FIG. 16. In an example, fabricating the double-contoured shim 200 using the system 100 and/or according to the method 1000 and shimming structural components of the aircraft 1200 using the double-contoured shim 200 and/or according to the method 2000 may form a portion of component and subassembly manufacturing (block 1106) and/or system integration (block 1108). Further, fabricating the double-contoured shim 200 using the system 100 and/or according to the method 1000 and shimming structural components of the aircraft 1200 using the double-contoured shim 200 and/or according to the method 2000 may be implemented in a manner similar to components or subassemblies prepared while the aircraft 1200 is in service (block 1112). Also, fabricating the double-contoured shim 200 using the system 100 and/or according to the method 1000 and shimming structural components of the aircraft 1200 using the double-contoured shim 200 and/or according to the method 2000 may be utilized during system integration (block 1108) and certification and delivery (block 1110). Similarly, fabricating the double-contoured shim 200 using the system 100 and/or according to the method 1000 and shimming structural components of the aircraft 1200 using the double-contoured shim 200 and/or according to the method 2000 may be utilized, for example and without limitation, while the aircraft 1200 is in service (block 1112) and during maintenance and service (block 1114).

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1-12, 15 and 17, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1-12, 15 and 17, referred to above, need be included in every example and not all elements, features, and/or components described herein are necessarily depicted in each illustrative example. Accordingly, some of the elements, features, and/or components described and illustrated in FIGS. 1-12, 15 and 17 may be combined in various ways without the need to include other features described and illustrated in FIGS. 1-12, 15 and 17, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-12, 15 and 17, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-12, 15 and 17, and such elements, features, and/or components may not be discussed in detail herein with reference to each of FIGS. 1-12, 15 and 17. Similarly, all elements, features, and/or components may not be labeled in each of FIGS. 11-12, 15 and 17, but reference numerals associated therewith may be utilized herein for consistency.

In FIGS. 13-15, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 13-15 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the system 100, the method 1000, the double-contoured shim 200, and the method 2000 have been shown and described, modifications may occur to those skilled in the art upon reading the specification. The present application includes such modifications and is limited only by the scope of the claims.

What is claimed is:

1. A system for fabricating a double-contoured shim, the system comprising:

a computer that:

receives measurement data for a first mating-surface of a first component and a second mating-surface of a second component;

aligns the measurement data;

determines dimensions of a space between the first mating-surface and the second mating-surface based on aligned measurement data;

generates a shim model representing the space;

generates a virtual plane positioned within the space such that the virtual plane divides the space into a first portion and a second portion;

generates a first shim model that substantially fills the first portion of the space by generating a first group of vectors extending from the virtual plane toward the first mating-surface normal to the virtual plane; and generates a second shim model that substantially fills the second portion of the space by generating a second group of vectors extending from the virtual plane toward the second mating-surface normal to the virtual plane; and a manufacturing system that:

fabricates a first shim that is based on the first shim model and that comprises a first contoured shim-surface that is complementary to a first mating-surface area of the first mating-surface and a first planar shim-surface that is opposite the first contoured shim-surface; and fabricates a second shim that is based on the second shim model and that comprises a second contoured shim-surface that is complementary to a second mating-surface area of the second mating-surface and a second planar shim-surface that is opposite the second contoured shim-surface.

2. The system of claim 1, wherein:

the computer generates three-dimensional geometry data for a space between a first virtual mating-surface and a second virtual mating-surface;

the virtual plane divides the space into a first portion and a second portion;

the first shim model substantially fills the first portion of the space between the virtual plane and the first virtual mating-surface; and the second shim model substantially fills the second portion of the space between the virtual plane and the second virtual mating-surface.

3. The system of claim 2, wherein the computer further:

aligns first measurement data of the first mating-surface and second measurement data of the second mating-surface;

generates a first virtual shim-surface from the first measurement data that is complementary to a first virtual-surface portion of the first virtual mating-surface; and generates a second virtual shim-surface from the second measurement data that is complementary to a second virtual-surface portion of the second virtual mating-surface.

4. The system of claim 3, wherein:

the computer generates first dimensions of first portion of the space between the first virtual shim-surface and the virtual plane and generates second dimensions of second portion of the space between the second virtual shim-surface and the virtual plane; and the manufacturing system fabricates the first shim that comprises a first thickness that varies as a function of the first dimensions and fabricates the second shim that comprises a second thickness that varies as a function of the second dimensions.

5. The system of claim 4, wherein the computer:

generates a planar data set corresponding to the virtual plane;

determines the first dimensions between the planar data set and the first virtual shim-surface for use as the first thickness of the first shim; and determines the second dimensions between the planar data set and the second virtual shim-surface for use as the second thickness of the second shim.

6. The system of claim 5, wherein the computer selects the planar data set at an approximately central location between the first virtual shim-surface and the second virtual shim-surface.

7. The system of claim 3, wherein:

the computer determines a first virtual shim-surface contour of the first virtual shim-surface and a second virtual shim-surface contour of the second virtual shim-surface; and the manufacturing system fabricates the first contoured shim-surface of the first shim that comprises a first shim-surface contour that varies as a function of the first virtual shim-surface contour and fabricates the second contoured shim-surface of the second shim that comprises a second shim-surface contour that varies as a function of the second virtual shim-surface contour.

8. The system of claim 3, wherein the computer:

selects a first data set of the first measurement data corresponding to the first mating-surface area of the first mating-surface to generate the first virtual shim-surface; and selects a second data set of the second measurement data corresponding to the second mating-surface area of the second mating-surface to generate the second virtual shim-surface.

9. The system of claim 1, wherein the manufacturing system couples the first shim and the second shim together along the first planar shim-surface and the second planar shim-surface.

10. A computer-implemented method for fabricating a double-contoured shim, the method comprising:

receiving measurement data for a first mating-surface of a first component and a second mating-surface of a second component;

aligning the measurement data;

determining dimensions of a space between the first mating-surface and the second mating-surface based on aligned measurement data generating a shim model representing the space;

generating a virtual plane positioned within the space such that the virtual plane divides the space into a first portion and a second portion;

generating a first shim model that substantially fills the first portion of the space by generating a first group of vectors extending from the virtual plane toward the first mating-surface normal to the virtual plane;

generating a second shim model that substantially fills the second portion of the space by generating a second group of vectors extending from the virtual plane toward the second mating-surface normal to the virtual plane;

fabricating a first shim, based on the first shim model, that comprises a first contoured shim-surface that is complementary to a first mating-surface area of the first mating-surface and a first planar shim-surface that is opposite the first contoured shim-surface; and fabricating a second shim, based on the second shim model, that comprises a second contoured shim-surface that is complementary to a second mating-surface area of the second mating-surface and a second planar shim-surface that is opposite the second contoured shim-surface.

11. The method of claim 10, further comprising generating three-dimensional geometry data for a space between a first virtual mating-surface and a second virtual mating-surface.

12. The method of claim 10, further comprising:

aligning first measurement data of the first mating-surface and second measurement data of the second mating-surface;

generating a first virtual shim-surface from the first measurement data that is complementary to a first virtual-surface portion of the first virtual mating-surface; and generating a second virtual shim-surface from the second measurement data that is complementary to a second virtual-surface portion of the second virtual mating-surface.

13. The method of claim 12, further comprising:

generating first dimensions of first portion of the space between the first virtual shim-surface and the virtual plane;

generating second dimensions of second portion of the space between the second virtual shim-surface and the virtual plane;

fabricating the first shim that comprises a first thickness that varies as a function of the first dimensions; and fabricating the second shim that comprises a second thickness that varies as a function of the second dimensions.

14. The method of claim 13, further comprising:

generating a planar data set corresponding to the virtual plane;

determining the first dimensions between the planar data set and the first virtual shim-surface for use as the first thickness of the first shim; and determining the second dimensions between the planar data set and the second virtual shim-surface for use as the second thickness of the second shim.

15. The method of claim 14, further comprising:

determining a first virtual shim-surface contour of the first virtual shim-surface;

determining a second virtual shim-surface contour of the second virtual shim-surface;

fabricating the first contoured shim-surface of the first shim that comprises a first shim-surface contour that varies as a function of the first virtual shim-surface contour; and fabricating the second contoured shim-surface of the second shim that comprises a second shim-surface contour that varies as a function of the second virtual shim-surface contour.

16. The method of claim 13, further comprising:

generating the first measurement data and the second measurement data;

aligning the first measurement data with first nominal-location data; aligning the second measurement data with second nominal-location data;

selecting a first data set of the first measurement data corresponding to the first mating-surface area of the first mating-surface to generate the first virtual shim-surface; and selecting a second data set of the second measurement data corresponding to the second mating-surface area of the second mating-surface to generate the second virtual shim-surface.

17. The method of claim 10, wherein fabricating the first shim and the second shim comprises subtractively manufacturing the first shim and the second shim.

18. The method of claim 10, wherein fabricating the first shim and the second shim comprises additively manufacturing the first shim and the second shim.

19. The method of claim 10, further comprising coupling the first shim and the second shim together along the first planar shim-surface and the second planar shim-surface.

20. A double-contoured shim for filling a gap between a first mating-surface of a first component and a second mating-surface of a second component, the double-contoured shim comprising:

a first shim that comprises a first shim cross-sectional axis, a first contoured shim-surface, and a first planar shim-surface that is opposite the first contoured shim-surface along the first shim cross-sectional axis; and a second shim that comprises a second shim cross-sectional axis, a second contoured shim-surface, and a second planar shim-surface that is opposite the second contoured shim-surface along the second shim cross-sectional axis, wherein the first shim and the second shim are coupled together along the first planar shim-surface and the second planar shim-surface.

* * * * *